(12) United States Patent
Becherer et al.

(10) Patent No.: US 10,199,070 B2
(45) Date of Patent: Feb. 5, 2019

(54) DIGITAL AUDIO DATA USER INTERFACE CUSTOMIZATION BASED ON USER EXPERTISE, CONTENT TYPE, OR TESTING

(71) Applicant: Adobe Systems Incorporated, San Jose, CA (US)

(72) Inventors: Nico Alexander Becherer, Hamburg (DE); Hartmut Warncke, Hamburg (DE); Falk Ferdinand Albrecht Oswald, Hamburg (DE); Durin Gleaves, Seattle, WA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/477,590

(22) Filed: Apr. 3, 2017

(65) Prior Publication Data

US 2018/0286462 A1    Oct. 4, 2018

(51) Int. Cl.
| | | |
|---|---|---|
| G06F 17/00 | (2006.01) |
| G11B 27/036 | (2006.01) |
| G10H 1/00 | (2006.01) |
| G06F 3/16 | (2006.01) |
| G06F 17/30 | (2006.01) |
| H04S 1/00 | (2006.01) |
| H04N 21/439 | (2011.01) |
| G11B 20/10 | (2006.01) |

(52) U.S. Cl.
CPC ............ *G11B 27/036* (2013.01); *G06F 3/165* (2013.01); *G06F 17/30749* (2013.01); *G10H 1/0091* (2013.01); *H04N 21/439* (2013.01); *H04S 1/007* (2013.01); *G10H 2220/116* (2013.01); *G11B 2020/10546* (2013.01)

(58) Field of Classification Search
CPC . G11B 27/036; G06F 17/30749; G06F 3/165; G06F 3/167; G10H 220/116
See application file for complete search history.

(56) References Cited

U.S. PATENT DOCUMENTS

| | | | | |
|---|---|---|---|---|
| 2003/0028516 A1* | 2/2003 | Nakata | .................. | G10H 1/0025 |
| 2004/0089141 A1* | 5/2004 | Georges | ............... | G10H 1/0025 84/609 |
| 2006/0248173 A1* | 11/2006 | Shimizu | ................. | H04H 60/04 709/220 |
| 2008/0041220 A1* | 2/2008 | Foust | ................... | G11B 27/031 84/625 |

(Continued)

*Primary Examiner* — Andrew C Flanders
(74) *Attorney, Agent, or Firm* — Wolfe-SBMC

(57) ABSTRACT

A digital medium environment includes an audio processing application that generates a user interface for editing audio data. Sound effects are displayed each with a single adjuster according to an ordered workflow based on a mix type of an audio clip, such as music, dialogue, etc. Adjustment of a single adjuster for a sound effect causes adjustment of multiple parameters of an effects processor underlying the sound effect. Furthermore, effects processors corresponding to selected sound effects are placed in an effects rack in a correct order, rather than in an order in which the sound effects are selected, thus correcting user mistakes. The techniques described herein allow users of varied skill levels to work on a same project, and provide a dynamic interface suitable to the user's skill level that also facilitates comparative testing with an audio effect disabled and subsequently enabled without dropouts in the rendered audio.

20 Claims, 10 Drawing Sheets

(56) References Cited

U.S. PATENT DOCUMENTS

| | | | |
|---|---|---|---|
| 2009/0106429 A1* | 4/2009 | Siegal | G06Q 10/00 709/227 |
| 2010/0212478 A1* | 8/2010 | Taub | G10H 1/0058 84/645 |
| 2010/0280638 A1* | 11/2010 | Matsuda | G06F 3/165 700/94 |
| 2010/0281376 A1* | 11/2010 | Meaney | G11B 27/034 715/723 |
| 2014/0037111 A1* | 2/2014 | Uhle | H04H 60/04 381/119 |

* cited by examiner

US 10,199,070 B2

DIGITAL AUDIO DATA USER INTERFACE CUSTOMIZATION BASED ON USER EXPERTISE, CONTENT TYPE, OR TESTING

BACKGROUND

Audio editing and mixing are complex and challenging tasks, especially for users who are not trained in the art of processing sound, as are professional audio engineers. Since audio data can be of varied content types (e.g., music, dialogue, background, etc.), audio processing effects and their order of application usually depend on the content type to achieve a properly mixed audio track. Audio editing applications, such as included in a digital audio workstation (DAW) or non-linear editor (NLE), however, do not display a user interface based on the content of the audio data. Consequently, neophyte users often make mistakes when using existing user interfaces of audio editing applications, such as selecting an inappropriate audio effect, improperly adjusting an audio effect, or selecting audio effects in an incorrect order.

Moreover, audio editing applications display user interfaces that do not accommodate users of various skill levels. For instance, audio editing applications may display a simplified view in a user interface. Such a simplified view, however, can be insufficient for a trained audio engineer to make appropriate adjustments (e.g., by excluding access to certain adjustments), and at the same time, present too much information in an unorganized fashion as perceived by a novice user.

Furthermore, audio editing applications are poorly configured to enable comparative testing of audio mixes, such as comparisons of an audio effect being enabled or disabled. For instance, when an audio effect is disabled, audio editing applications remove the disabled effect from the processing chain without preserving delay lines caused by the disabled effect. Consequently, when comparing an audio mix by enabling and disabling an effect during playback, dropouts in the audio mix result from the disabled effect.

SUMMARY

Techniques and systems are described to generate user interfaces for audio editing applications based on a mix type of the audio data (e.g., a mix type corresponding to the content of the audio data), a user's expertise level, and to enable comparative testing of an audio effect when it is enabled and disabled. In one example, a user interface is generated that displays effects controls for controlling audio effects in an order based on the mix type of the audio data. In this way, the order of effects controls are displayed so that audio effects can be selected in a correct order, thereby preventing mistakes typically made by a novice user. In another example, a user interface is generated that displays effects controls and adjustable parameters corresponding to a selected effects control based on a user's expertise level. For instance, only a single adjuster of an effects control may be displayed for a novice user, but multiple parameters adjustable by the single adjuster may be displayed for a trained user. Moreover, the trained user can overwrite changes made by a novice user using the single adjuster. In still another example, a user interface is generated to enable comparative testing of audio mixes without dropouts, by preserving delay lines caused by a disabled effect when the audio data is played back.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
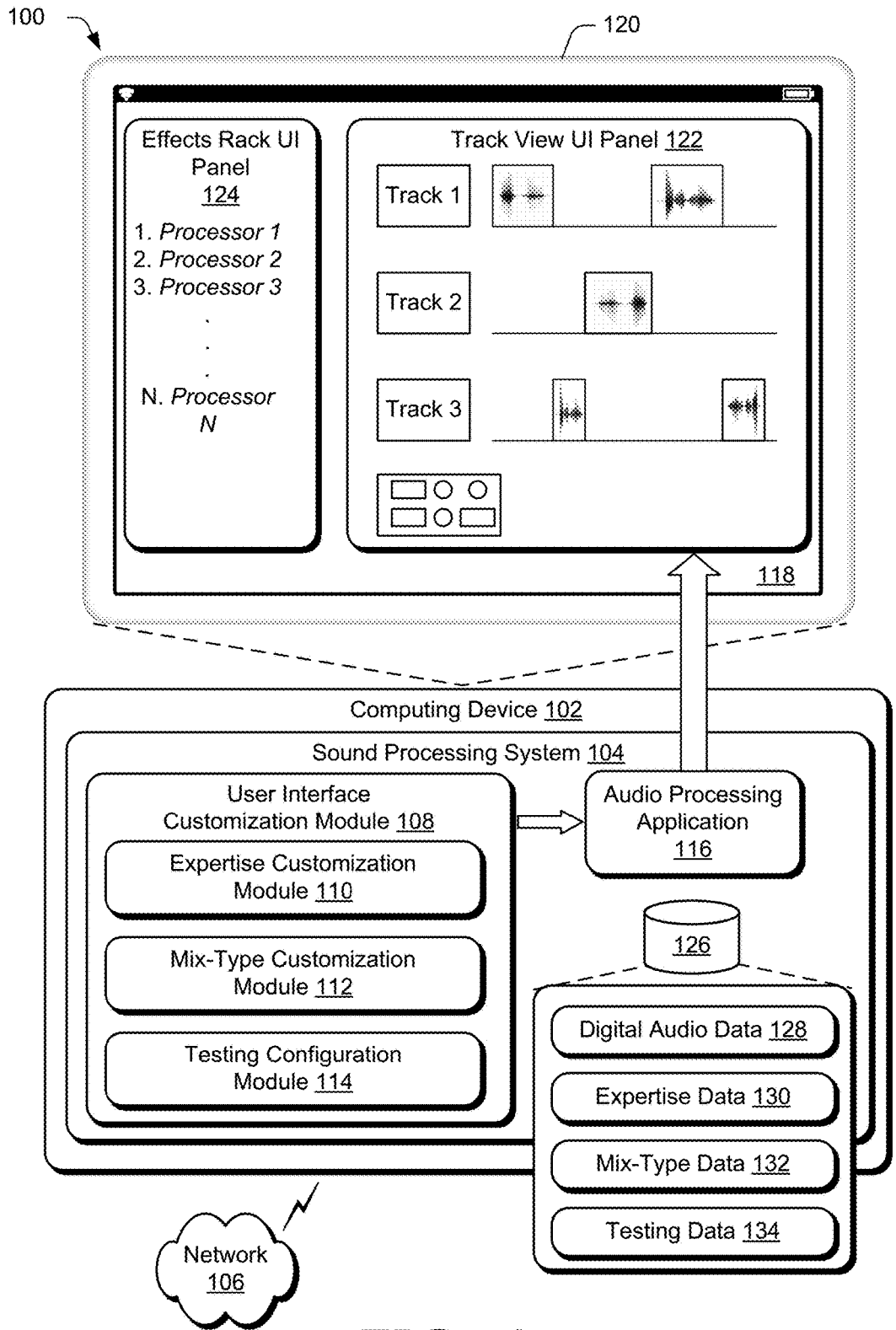
FIG. 1 is an illustration of a digital medium environment in an example implementation that is operable to employ techniques described herein.

Audio editing applications, such as included in a digital audio workstation (DAW) or non-linear editor (NLE), do not display a user interface based on the mix type of the audio data. The mix type depends on the content of the audio data, and examples of mix type include dialogue, sound effects, music, and ambience. Consequently, novice users are prone to making mistakes when using audio editing applications, such as selecting an inappropriate audio effect, improperly adjusting an audio effect, or selecting audio effects in an incorrect order. Moreover, audio editing applications are limited to displaying simplified views for novice users, which are usually inappropriate for a trained audio engineer (e.g., since the simplified views exclude access to advanced controls), while still presenting too much information in a perceived unorganized fashion to the novice user. Furthermore, audio editing applications are poorly configured to enable comparative testing of audio mixes, such as comparisons of an audio effect being enabled or disabled.

Accordingly, this disclosure describes systems and techniques for generating a dynamically configurable user interface for editing audio data that presents sound effects controls according to a predetermined workflow based on a mix type of a selected audio clip. Different sound effects controls can be displayed for different mix types, including dialogue, music, ambience, and the like. Furthermore, a particular effects control, such as compression or noise reduction, may be displayed for multiple mix types, and be configured differently for each of the mix types.

The user interface is configured to display sound effects controls using a single adjuster for each displayed sound effects control. Adjustment of the single adjuster for a respective effects control causes adjustment of multiple adjustable parameters of an effects processor (a function for modifying audio data) underlying the respective effects control. So as not to confuse the novice user, the multiple adjustable parameters can remain hidden to the novice user, who uses the single adjuster to adjust the respective effects control. However, a professional audio engineer can access the multiple adjustable parameters, such as upon verification of authorization, for full control of the respective effects control. Furthermore, a professional audio engineer may be able to overwrite settings made by a novice user with the single adjuster.

Moreover, when a user selects an effects control to enable an effect, an effects processor for the selected effects control and enabled effect is placed into an ordered effects rack of effects processors according to an order, such as determined using a rules database that assigns input and output relationships of effects processors. The rules database can be determined a priori by a professional audio engineer. By guaranteeing that effects processors are placed in the ordered effects rack according to the order, and not necessarily according to the order the user selects the effects controls, user mistakes are corrected, and effects processors are applied to the audio clip in a correct order.

Thus, multiple users of various skill levels can work on a same project, while being presented editing options commensurate with their skill levels that automatically correct mistakes made by novice users (such as selecting effects controls and enabling effects to be applied to an audio clip in an incorrect order).

In addition, when audio data is rendered (e.g., played back) and an effect is disabled, the user interface maintains effects processors corresponding to the disabled effect in the effects rack by preserving delay lines caused by the disabled effect, rather than removing effects processors corresponding to the disabled effect from the effects rack during playback. Hence, the user interface enables comparative testing of audio mixes without dropouts caused by disabled effects.

The systems and techniques described herein constitute an improvement over current approaches which primarily present a simplified user interface with limited editing abilities for use by all users on a project. The nature of the described aspects to present effects controls in an ordered workflow based on a mix type of an audio clip, and place effects processors in an ordered effects rack according to an order of effects processors, results in efficient editing of audio clips that saves time and resources, as discussed below in more detail.

In the description below, techniques for editing audio clips are described in the context of editing an asset, such as a video (e.g., audio clips can be processed and mixed into an audio track of the video). It is to be appreciated and understood, however, that the techniques can be utilized with various assets other than videos that contain at least one audio clip, such as digital audio files, sampled analog audio recordings, images, documents, presentations, drawings, maps, blogs, web pages, social media posts, and the like without departing from the spirit and scope of the claimed subject matter.

Furthermore, in the description below, techniques and workflows for asset editing are described in the context of editing audio clips. It is to be appreciated and understood, however, that the techniques and workflows can be utilized to edit various components of an asset other than audio, such as video editing (e.g., editing and mixing video tracks, special effects, etc.), graphic design (e.g., type-setting, template compliance, image processing, etc.), and the like without departing from the spirit and scope of the claimed subject matter.

Term Examples

"Asset" describes any source material that includes audio data, such as videos, ads, audio files, multi-media streams, animations, images, web documents, web pages, applications, device applications, text documents, drawings, presentations and so forth.

"Effects category" describes a group of effects controls that correspond to a related sound effect. Examples of effects categories include Unify Loudness, Repair Sound, and Volume.

"Effects control" describes an adjustment for controlling an audio effect applicable to audio data. Examples of effects controls belonging to a Repair Sound effects category include Reduce Noise, Reduce Rumble, and Dehum.

"Effects processor" describes a function for modifying audio data when an audio effect is applied to the audio data. An example of an effects processor is Adaptive Noise Reduction corresponding to a Reduce Noise effects control.

"Effects rack" describes an ordered list of effects processors applicable to audio data. Effects processors are applied to the audio data according to the ordering of the effects rack.

"Mix type" describes content of audio data according to a source or type of the content. Examples of mix type include dialogue, sound effects, music, and ambience.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a computing device 102 including a sound processing system 104 that may implement corresponding functionality described herein.

Computing device 102 may be configured as any suitable type of computing device. For example, the computing device may be configured as a desktop computer, a laptop computer, a workstation (e.g., a non-linear editor (NLE) or digital audio workstation (DAW)), a mobile device (e.g., a device with a handheld configuration such as a tablet or mobile phone), a tablet, a camera, a gaming station, and so forth. Thus, the computing device 102 may range from full resource devices with substantial memory and processor resources (e.g., personal computers, game consoles) to a low-resource device with limited memory or processing resources (e.g., mobile devices).

Various types of input devices and input instrumentalities can be used to provide input to computing device 102. For example, computing device 102 can recognize input as being a mouse input, stylus input, touch input, input provided through a natural user interface, and the like. Thus, computing device 102 can recognize multiple types of gestures including touch gestures and gestures provided through a natural user interface.

Figure 10:
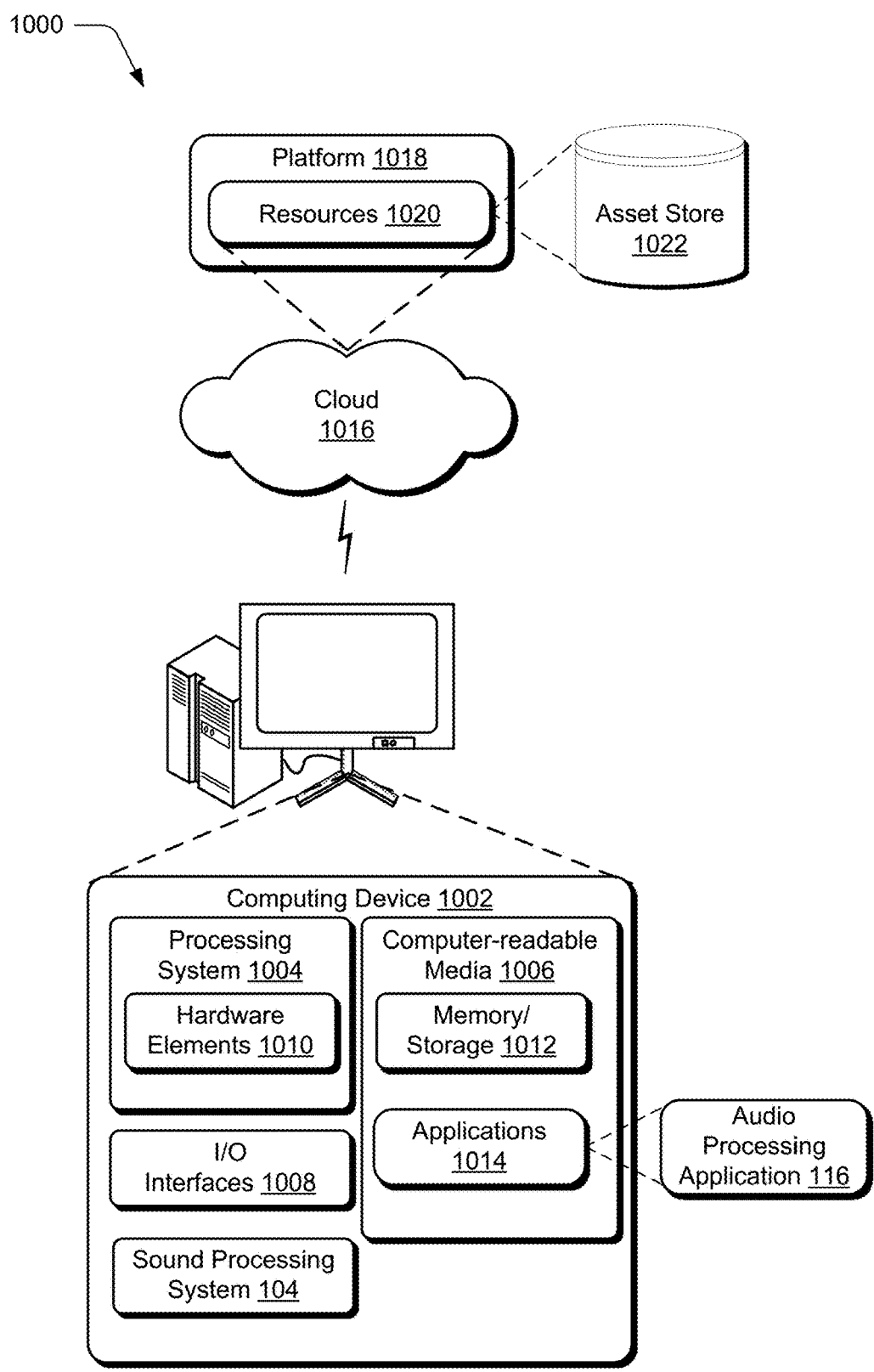
FIG. 10 illustrates an example system including various components of an example device that can be implemented as any type of computing device as described and/or utilize with reference to FIGS. 1-9 to implement aspects of the techniques described herein.

Furthermore, computing device 102 may be representative of one or a plurality of different devices, such as one ore more devices connected to network 106 that perform operations "over the cloud" as further described in relation to FIG. 10. Network 106 may comprise a variety of networks, including the Internet, an intranet, local area network (LAN), wide area network (WAN), personal area network (PAN), body area network (BAN), cellular networks, terrestrial networks, satellite networks, combinations of networks, and the like, and as such may be wired, wireless, or a combination thereof.

Sound processing system 104 includes user interface customization module 108, comprising expertise customization module 110, mix-type customization module 112, and testing configuration module 114. Expertise customization module 110 is configured to obtain a user's expertise level. A user's expertise level can be obtained in any suitable way, such as by verifying a user's identification, membership in a group, access level, training level, employment, fingerprint, eye scan, combinations thereof, and the like. In one example, a user's expertise level can be a first expertise level corresponding to a novice user or a second expertise level corresponding to a trained audio engineer.

Mix-type customization module 112 is representative of functionality configured to determine a mix type of audio data. In one example, mix types include dialogue, sound effects, music, and ambience. Additionally or alternatively, mix types can include any suitable type of content, such as animal noises, previously mixed content, Doppler-affected content, live recordings, and the like. The mix type can be obtained in any suitable way. In one example, a user assigns a mix type to an audio clip. An indication of mix type can also be included in metadata of an audio clip, and determined therefrom.

Testing configuration module 114 is representative of functionality configured to determine a type of testing. One type of testing is comparative testing. A user may input to sound processing system 104 that comparative testing is to be performed. For instance, the user may wish to compare an audio track with an effect enabled and then disabled, in an "A/B" testing scenario. When comparative testing is performed, disabled effects are not removed, but instead delay lines of effects processors corresponding to the disabled effect are preserved during audio playback, so that testing can be performed to compare the effect being enabled and disabled without dropouts in the rendered audio.

User interface customization module 108 supplies data from expertise customization module 110, mix-type customization module 112, and testing configuration module 114 to audio processing application 116. For instance, user interface customization module 108 supplies expertise data indicating a user's expertise level from expertise customization module 110, mix-type data indicating a mix type obtained in mix-type customization module 112, and testing data indicating a type of testing determined in testing configuration module 114 to audio processing application 116.

Audio processing application 116 enables editing and mixing of audio data. Based on the data supplied from user interface customization module 108, audio processing application 116 generates user interface 118 displayed in display 120 comprising computing device 102. For instance, user interface 118 is generated based on a user's expertise level determined by expertise customization module 110, the mix type obtained in mix-type customization module 112, and/or the type of testing determined in testing configuration module 114. Audio processing application 116 generates a dynamically configurable user interface, such as user interface 118, that guides the user through a predetermined editing workflow by presenting effects controls according to an order and placing effects processors in an ordered effects rack, as described below in more detail. In this example, user interface 118 is displayed with a track view UI panel 122 and an effects rack UI panel 124. The track view UI panel 122 displays representations of audio clips on a number of audio tracks, and the effects rack UI panel 124 displays effects processors applicable to the audio clips represented in the track view UI panel 122 to implement audio effects.

Computing device 102 also includes resources 126. Resources 126 may be licensed, purchased, or may be made freely available, (e.g., without authentication, license, or account-based access). The resources 126 can include any suitable combination of services and content, such as made available over the network 106 by one or more providers. Some examples of services include, but are not limited to, an asset processing service, a video editing service, a photo editing service, a web development and management service, a collaboration service, a social networking service, a messaging service, an advertisement service, and so forth. Content may include various combinations of assets, including videos, ads, audio, multi-media streams, animations, images, web documents, web pages, applications, device applications, text documents, drawings, presentations, and the like. In the context of editing audio clips described herein, assets comprise audio clips that can be edited (e.g., filtered and mixed into a track according to a timeline) using audio processing application 116. Audio clips are moveable snippets of audio, usually small in duration, that can be moved on the timeline and can be processed independently of each other. In one example, multiple audio clips are grouped, and the group is processed together. Assets can be any suitable type of asset that comprises at least one audio clip, such as a video, image, digital audio file, sampled analog audio recording, document, presentation, drawing, map, blog, web page, social media post, and the like. Audio clips are stored as digital audio data 128 comprising resources 126.

Furthermore, resources 126 may store expertise data 130, mix-type data 132, and testing data 134. Expertise data 130 includes the user's expertise level obtained in expertise customization module 110. Mix-type data 132 includes the mix type obtained in mix-type customization module 112. Testing data 134 includes the type of testing determined in testing configuration module 114. Resources 126 are made available to the audio processing application 116, and can be used by audio processing application 116 to generate the user interface 118.

Having considered an example digital medium environment, consider now a discussion of an example system usable to generate a user interface for editing audio data.

Example User Interface Generation

Figure 2:
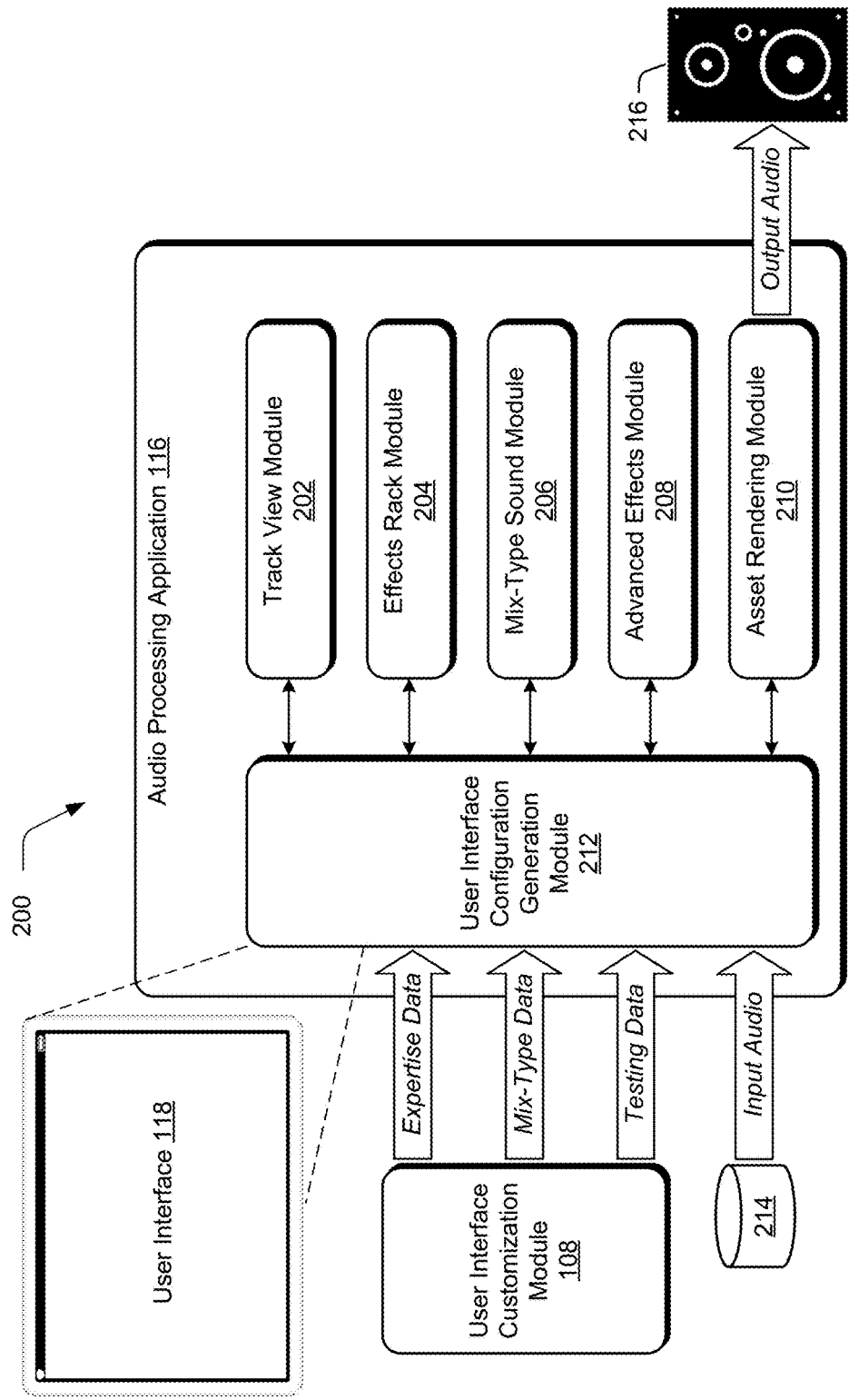
FIG. 2 illustrates an example system usable to generate a user interface (UI) for editing audio data in accordance with one or more aspects of the disclosure.

FIG. 2 illustrates an example system 200 usable to generate a user interface for editing audio data. In this implementation, example system 200 includes audio processing application 116 and user interface customization module 108 to generate user interface 118. Audio processing application 116 includes track view module 202, effects rack module 204, mix-type sound module 206, advanced effects module 208, asset rendering module 210, and user interface configuration generation module 212.

Furthermore, audio processing application 116 is connected to file storage 214 and loudspeaker 216. File storage 214 stores assets comprising audio files, and provides the assets to audio processing application 116. For instance, audio files in file storage 214 may be obtained from digital audio data 128 in FIG. 1. Audio files may adhere to an Audio Engineering Society (AES) format, or any other suitable format or standard, and be suitably stored on file storage 214. File storage 214 can include any suitable non-transitory computer-readable storage media, such as, by way of example and limitation, a disk, disc, tape, hard drive, thumb drive, card, combinations thereof, and the like. Furthermore, file storage 214 may comprise a same device as audio processing application 116, such as computing device 102, and therefore be collocated with audio processing application 116. Additionally or alternatively, file storage 214 can comprise a separate device from audio processing application 116. For instance, file storage 214 may comprise a server that is located at a physical different location than a device comprising audio processing application 116. Accordingly, file storage 214 can provide audio files to audio processing application 116 via a network or networks, such as network 106.

Audio input to audio processing application 116, such as an audio file, can include one or a plurality of audio channels, such as stereo (left and right channels), surround sound (more than two channels, five, six, or eight being common), or one or more mono channels (for instance, different speakers in an interview recorded on different audio channels). The input audio contains digital samples of an audio signal or signals. The digital samples can be at any suitable bit width and at any suitable sample rate. As a non-limiting example, the input audio file includes stereo audio channels, each channel sampled at 44.1 KHz and represented by 16 bits per sample.

Track view module 202 is representative of functionality that implements management and processing of audio clips. Track view module 202 can process audio files, such as from file storage 214, into audio clips, which are moveable snippets of audio, usually small in duration, that can be moved on a timeline and can be processed independently of each other. In one example, track view module 202 resamples at least some audio clips to make the sampling rate of audio clips a same sampling rate. Track view module 202 manages multiple tracks of audio, each of which contains at least one audio clip. Track view module 202 can generate one or more tracks (e.g., audio tracks) associated with a timeline onto which audio clips can be placed. For example, track view module 202 can provide a master track that is indexed according to a time base, and provide a mechanism for placing audio clips from various tracks onto the master track (e.g., mixing the audio clips onto another track).

Track view module 202 can also enable processing of audio clips to aid in mixing the audio clips, such as by generating and managing controls for fade, gain adjustment, balance, time shift, applying preset filters (e.g., low-pass, band-pass, or high-pass), clip, and the like. Track view module 202 also generates and provides various controls for audio tracks, such as play, stop, pause, advance (e.g., fast forward), retard (e.g., rewind), skip (e.g., skip to another marker, indicator, chapter, or the like designated for an audio track or audio clip), and the like. For instance, an audio track can be selected, and playback enabled by selecting the audio track and enabling a playback control provided by track view module 202. When playback is enabled in track view module 202, audio is played back through loudspeaker 216. Though loudspeaker 216 is illustrated as a single loudspeaker, loudspeaker 216 can represent a plurality of loudspeakers, such as two, five, six, or eight loudspeakers.

Track view module 202 can also generate representations of audio clips that can be displayed in user interface 118, such as on an audio track timeline. For instance, representations of audio clips may include a time-domain graph of the audio clip, a frequency response plot of the audio clip, an indicator of a filename from which the audio clip was loaded into audio processing application 116, combinations thereof, and the like. Moreover, representations of audio clips generated by track view module 202 can be dynamic representations that change their appearance over time (e.g., when the track is played). For instance, representations of audio clips may include an animation which changes when the audio clip is played. In one example, representations of audio clips include a display of spectral content that is updated to match the present spectral content when the audio clip is played.

Data from track view module 202 to generate user interface 118, such as timelines, representations of audio clips, playback controls, and the like is provided to user interface configuration generation module 212.

Effects rack module 204 is representative of functionality that implements management of effects processors that can be applied to one or more audio clips. Effects rack module 204 maintains an ordered effects rack of effects processors (e.g., effects processors are maintained according to an order) and generates a representation of the effects processors based on the order. In one example, a representation of the effects processor is an enumerated list of effects processors. Additionally or alternatively, effects rack module 204 can generate a table of effects processors based on the order of the ordered effects rack.

Effects rack module 204 places effects processors in the ordered effects rack to ensure that the order in which effects processors are used (e.g., applied to an audio clip) is consistent with input and output relationships designated as correct, such as, according to a rules database that assigns input and output relationships of effects processors. The rules database can be determined a priori by a professional audio engineer. Examples of the ordering of effects processors used by effects rack module 204 include, by way of example and not limitation, (i) applying a noise removal processor before applying a compression processor, (ii) applying an equalization processor before applying a limiter processor, and (iii) applying a normalization processor before applying a dehumming processor The ordering of the ordered effects rack inhibits user mistakes made by selecting effects controls in an incorrect order and thereby enabling effects processors in an incorrect order.

The order of effects processors in the ordered effects rack maintained by effects rack module 204 can be unrelated to (e.g., not determined from) an order in which a user selects effects controls. For instance, a user may select a limiter effect control before selecting a normalization effect control. Effects rack module 204, however, places a limiter processor corresponding to the selected limiter effect control after a normalization processor corresponding to the selected normalization effect control in the ordered effects rack.

Effects rack module 204 can also generate various status indicators of effects processors. In one example, an effects processor in the ordered effects rack is denoted as bypassed during playback by an appropriate indicator, such as using an icon, or fading, coloring, highlighting, or otherwise changing the appearance of the bypassed effect processor in the representation of the effects processors generated by effects rack module 204. In another example, an indication that an audio clip has been pre-rendered using an effects processor is generated by effects rack module 204 and displayed in the ordered effects rack.

Data from effects rack module 204 to generate user interface 118, such as representations of effects processors, status indicators of effects processors, and the like is provided to user interface configuration generation module 212.

Mix-type sound module 206 is representative of functionality that implements management of mix type, and effects categories and effects controls based on the mix type. Mix-type sound module 206 obtains an indication of a mix type of at least one audio clip, such as from user interface customization module 108 via user interface configuration generation module 212. In one example, mix types include dialogue, sound effects, music, and ambience. Alternatively or additionally, mix types can include any suitable type of content, such as animal noises, previously mixed content, Doppler-affected content, live recordings, and the like.

Mix-type sound module 206 determines effects categories and effects controls based on the mix type of the audio clip. Effects categories contain effects controls, which can be selected to enable one or more effects processors. For example, a Repair Sound category may contain effects controls Reduce Noise, Reduce Rumble, and Dehum. Effects categories and effects controls can be determined in any suitable way, such as according to a database of workflows containing ordered effects categories and ordered effects controls for various mix types. The database can be determined a priori by a professional audio engineer. Mix-type sound module 206 enables presentation of effects categories and effects controls according to a workflow, such as a workflow that a professional audio engineer would use for a given mix type that is included in the database of workflows. In one example, effects categories and effects controls are displayed in user interface 118 in an order according to a predetermined workflow by displaying the effects categories and the effects controls from top to bottom in a graphical user interface, such as user interface 118.

Mix-type sound module 206 enables adjustment of multiple effects controls each using a single adjuster for the corresponding effects control. For instance, a user can adjust an effects control by adjusting a single control that governs the effects control. In one example, dehumming is controlled by a single adjuster that adjusts an amount of dehum from 0 to 100%. By adjusting the single adjuster for an effects control, multiple parameters of an effects processor corresponding to the effects control are adjusted (discussed below in more detail with respect to advanced effects module 208).

Mix-type sound module 206 also enables selection of effects. For instance, a user may adjust an effects control and thereby select an effect associated with the effects control. In response to selecting an effects control and enabling an effect, mix-type sound module 206 communicates to effects rack module 204, which places one or more effects processors corresponding to the adjusted and selected effect in the ordered effects rack maintained by effects rack module 204.

Data from mix-type sound module 206 to generate user interface 118, such as effects categories, effects controls, and the like is provided to user interface configuration generation module 212.

Advanced effects module 208 is representative of functionality that implements management of effects processors underlying effects controls. Advanced effects module 208 enables control of multiple adjustable parameters of one or more effects processors corresponding to an effects control. For instance, by adjusting the single adjuster for an effects control managed by mix-type sound module 206, multiple parameters of an effects processor corresponding to the effects control are adjusted by advanced effects module 208.

In one example, a single adjuster corresponding to a filter cutoff frequency effects control can be adjusted using mix-type sound module 206 (e.g., by setting a high-pass filter cutoff frequency), and in response, advanced effects module 208 adjusts multiple coefficients of a programmable filter processor (e.g., 256 time-domain coefficients or 512 frequency-domain coefficients) corresponding to the filter cutoff frequency effects control. In another example, a single adjuster corresponding to a noise effect control can be adjusted using mix-type sound module 206, and in response, advanced effects module 208 adjusts programmable parameters for convergence factor (such as a step size), initialization, update rate, filter size, error term normalization, etc. of an adaptive noise reduction effects processor.

Advanced effects module 208 enables display of multiple adjustable parameters of an effects processor corresponding to a respective effect. For instance, filter coefficients can be displayed in a time-domain or frequency-domain representation of the filter, and the representation can be adjusted to cause the filter coefficients to be adjusted. For example, a filter's frequency response can be "grabbed" at one or more points and moved, causing filter coefficients to be recalculated to match the moved frequency response. In another example, an effects processor comprises multiple adjustable parameters that are each displayed with a single adjuster, such as a slider or knob for each adjustable parameter. For instance, instead of or in addition to displaying filter coefficients, displayed single adjusters may each control a parameter of a filter's frequency response, such as a start frequency, a stop frequency, a dampening factor, a quality (Q) factor (e.g., a ratio of the filter's center frequency to bandwidth), a number of filter coefficients, and the like.

Advanced effects module 208 also receives expertise data from user interface customization module 108, via user interface configuration generation module. In one example, only authorized users determined from the expertise data, such as professional audio engineers, are allowed access to the effects processors underlying effects managed by advanced effects module 208. Based on a user being authorized, advanced effects module 208 allows the user to access, adjust, and save changes to effects processors. In one example, an authorized user can overwrite settings and adjustments (e.g., adjustments made using single adjusters of effects controls managed by mix-type sound module 206) made by an unauthorized user (e.g., a user not authorized by advanced effects module 208).

Advanced effects module 208 also enables defining of mappings between adjustable parameters of effects processors managed by advanced effects module 208 and respective single adjusters managed by mix-type sound module 206. In one example, an authorized user can define mappings between multiple adjustable parameters of an effects processor managed by advanced effects module 208 and a single adjuster of a corresponding effects control managed by mix-type sound module 206. For example, an authorized user, such as a professional audio engineer, can define keyframe values of adjustable parameters of an effects processor, such as minimum and maximum values of an adjustable parameter. The effects processor is mapped to the adjustment of the respective single adjuster by interpolating the multiple adjustable parameters between keyframe values. For instance, as the single adjuster of an effects control is moved from one extreme setting of adjustment to the other extreme setting of adjustment, adjustable parameters of an effects processor corresponding to the effects control are continuously moved between minimum and maximum keyframe values designated for each adjustable parameter. Multiple keyframe values can be defined for each adjustable parameter, and mapped to a plurality of regions of adjustment of a respective single adjuster. For example, for each region of adjustment of a respective single adjuster, an adjustable parameter of an effects processor is interpolated between two keyframe values set for the adjustable parameter.

In one example, the multiple adjustable parameters are learned through a learning algorithm (e.g., a machine learning algorithm) Advanced effects module 208 may contain a learning algorithm that observes adjustments and settings made by authorized users over a time period, and based on the observations, learns parameters used by authorized users for various types of adjustments, such as for slight adjustments and for heavy adjustments, and determines mappings of the multiple adjustable parameters managed by advanced effects module 208 and single adjusters managed by mix-type sound module 206. Additionally or alternatively, advanced effects module 208 can obtain mappings between multiple adjustable parameters managed by advanced effects module 208 and single adjusters managed by mix-type sound module 206 from a learning algorithm implemented on a device other than the device implementing audio processing application 116. For instance, advanced effects module 208 can obtain mappings from a service provider that implements a machine learning algorithm to learn the mappings.

Data from advanced effects module 208 to generate user interface 118, such as adjustable parameters, filter representations, and the like is provided to user interface configuration generation module 212.

Asset rendering module 210 is representative of functionality that implements rendering of assets. For instance, responsive to enabling playback in track view module 202 of an audio track of an asset comprising a video, asset rendering module 210 enables rendering of the video concurrent with the playback of the audio track. Asset rendering module 210 can render an asset in any suitable way, such as by way of example and not limitation, playing a video, displaying an image, presenting a slide presentation, formatting and displaying a document, playing an animation, overlaying text, and the like.

Data from asset rendering module 210 to generate user interface 118, such as images, video, animations, and the like is provided to user interface configuration generation module 212.

User interface configuration generation module 212 generates user interface 118 according to a user interface configuration determined from data supplied to user interface configuration generation module 212. Data supplied to user interface configuration generation module 212 includes expertise data, mix-type data, and testing data from user interface customization module 108 (as described with respect to FIG. 1), input audio data from file storage 214, and data from track view module 202, effects rack module 204, mix-type sound module 206, advanced effects module 208, and asset rendering module 210. Accordingly, user interface configuration generation module 212 generates user interface 118 that presents sound effects controls according to a predetermined workflow based on a mix type of a selected audio clip. Furthermore, user interface 118 enables multiple users of various skill levels to work on a same project, while presenting editing options commensurate with their skill levels that automatically correct mistakes made by novice users, as described below in more detail.

Having considered an example system 200, consider now a discussion of example user interfaces generated using example system 200.

Example User Interfaces

Figure 3:
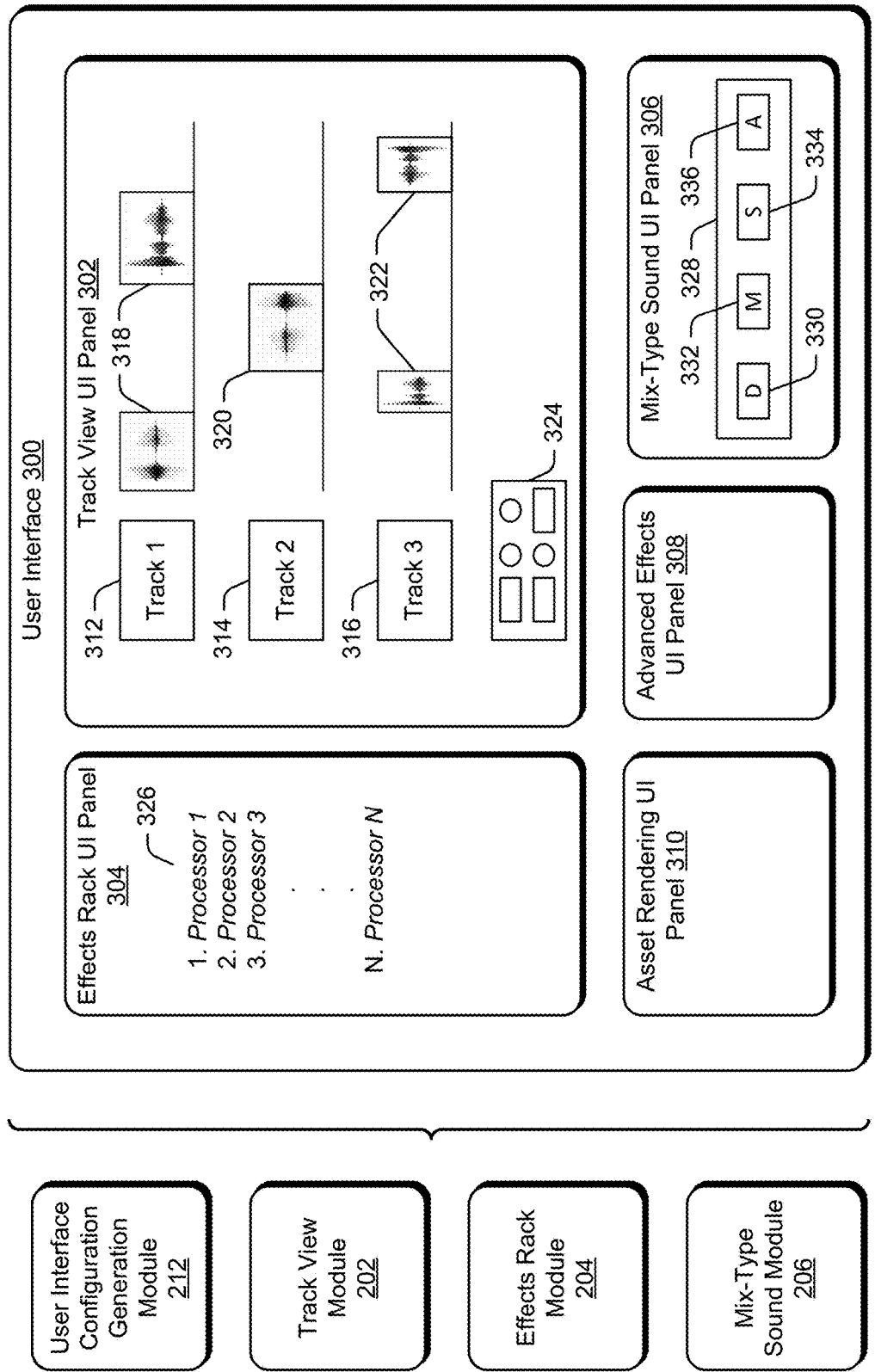
FIG. 3 is an example user interface in accordance with one or more aspects of the disclosure.

FIG. 3 illustrates an example user interface 300 in accordance with one or more aspects of the disclosure. User interface 300 in FIG. 3 is an example of user interface 118 in FIGS. 1 and 2, and can be generated by user interface configuration generation module 212 using data supplied from track view module 202, effects rack module 204, and mix-type sound module 206.

User interface 300 supports user interaction with audio processing application 116 in FIG. 1 and FIG. 2. For example, user interface 300 can be an interface to a DAW or NLE used to edit and mix audio clips. User interface 300 contains multiple UI panels, including track view UI panel 302, effects rack UI panel 304, mix-type sound UI panel 306, advanced effects UI panel 308, and asset rendering UI panel 310. For simplicity's sake, the discussion of user interface 300 is reserved to these UI panels. However, various aspects can include additional windows and UI panels without departing from the scope of the subject matter described herein. For example, such windows and UI panels not shown in FIG. 3 may include, but are not limited to, tool bars, task bars, clocks, history panels, file structure windows, audio statistics panels, and the like.

Furthermore, though the UI panels in FIG. 3 are illustrated in a convenient arrangement for clarity, any suitable arrangement of UI panels is possible. For example, a user may select and drag any UI panel to relocate the UI panel within user interface 300. Though the UI panels are illustrated as not overlapping, a user may move a UI panel and cause it to overlap another UI panel. By selecting a particular UI panel, such as with a left click, or right click which opens selectable tabs with an option to select the UI panel, the user can cause the selected UI panel to be brought to the front of user interface 300 so it can be viewed unblocked by another UI panel.

Track view UI panel 302 displays controls and representations of audio clips to aid a user in editing and mixing the audio clips. For instance, track view UI panel 302 displays track indicators 312, 314, and 316, for track 1, track 2, and track 3, respectively. In the example track view UI panel 302, three tracks are shown for simplicity. However, any suitable number of tracks and track indicators can be displayed in track view UI panel 302. Furthermore, one of the displayed tracks in track view UI panel 302 can be a track onto which other tracks are mixed, such as a master track.

Track indicators 312, 314, and 316 are each configurable to display information about the respective track. In one example, right-clicking a track indicator enables a window to be displayed proximate the track indicator (not shown) that displays information about the respective track, such as by way of example and not limitation, sampling rate and bit width of the audio track, indication of dithering in the sampling process, percentage of a timeline in a master track that the respective track is used, an indication of whether the track is pre-rendered, and the like. Furthermore, track indicators 312, 314, and 316 can each contain controls for various adjustments that can be made to the track, such as fade, gain adjustment, balance, time shift, applying preset filters (e.g., low-pass, band-pass, or high-pass), clip, compress, and the like.

Track 1, track 2, and track 3 each contain at least one audio clip, and are shown by way of example and not limitation. For instance, tracks may also be empty (e.g., contain no audio clips). Track view UI panel 302 displays representations of the audio clips for each of the tracks, such as on timelines for each of the tracks. For instance, in the example of FIG. 3, track 1 comprises two audio clips denoted by representations 318, track 2 comprises one audio clip denoted by representation 320, and track 3 comprises two audio clips denoted by representations 322. In one example, the width of a displayed representation of an audio clip is proportional to the duration of the audio clip. For instance, the durations of the audio clips corresponding to representations 322 are less than the duration of the audio clip corresponding to representation 320. Furthermore, displayed positions of each of the representations in track view UI panel 302 correspond to relative positions of the audio clips on a timeline. For example, as displayed in FIG. 3, track 1 occupies first and fourth positions of a timeline increasing from left to right, track 2 occupies a third position of the timeline, and track 3 occupies second and fifth positions of the timeline.

Representations 318, 320, and 322 are each configurable to display information about the respective audio clip corresponding to the representation. In one example, right-clicking a representation enables a window to be displayed proximate the representation (not shown) that displays information about the respective audio clip, such as by way of example and not limitation, the audio file name from which the audio clip belongs, dates the audio clip was recorded, an indication of whether the audio clip is licensed, equipment used to record the audio clip, sampling rate and bit width used to record the audio clip, performing and/or authoring artists of the audio clip, address of a web site from which the audio clip was obtained, and the like.

Representations 318, 320, and 322 can display any suitable type of representation of data in the audio clip, including time domain data (such as sample amplitudes versus time), frequency domain data (such as a spectrograph), time-frequency representations in three dimensions (such as a Wigner distribution displayed as a three-dimensional surface above a time-frequency plane), combinations thereof, and the like. In the example in FIG. 3, representations 318, 320, and 322 contain time-domain graphs. Moreover, representations 318, 320, and 322 can be dynamic representations that change their appearance over time (e.g., when the respective track or audio clip is played). For instance, representations of audio clips may include an animation. In one example, a user may select, such as from a drop down menu, what type of data the user would like displayed in a representation of an audio clip. 100801 Furthermore, audio clips can be moved along a timeline of a track, or between tracks, by selecting a representation of the audio clip and placing it in a desired position in the timeline of a track. For example, representation 320 can be selected, such as by hovering a cursor over it and clicking on it with a mouse, and dragged forward and backward along the timeline of track 2, or moved to the timeline of track 1, such as between the audio clips of representation 318.

Track view UI panel 302 also displays transport UI panel 324 for a user to interact with the audio tracks and audio clips, generally shown at transport UI panel 324 as a collection of rectangles and circles representing sliders, buttons, tabs, switches, knobs, and the like which a user may select, adjust and otherwise use to edit and mix audio clips using track view UI panel 302. Transport UI panel 324 can include a variety of control options for interacting with the audio tracks and audio clips, such as by way of example and not limitation, resampler, play, stop, pause, advance (e.g., fast forward), retard (e.g., rewind), skip (e.g., skip to another marker, indicator, chapter, or the like designated for an audio track or audio clip), and the like.

Effects rack UI panel 304 displays a representation 326 of an ordered effects rack of effects processors. In the example in FIG. 3, a representation 326 of the effects processors displayed in effects rack UI panel 304 is an enumerated list of effects processors indicated by processor names Processor 1 . . . Processor N, and numbers 1 . . . N. Any suitable type of representation of the ordered effects rack can be displayed, such as a table, a flowchart showing a chain of effects processors with inputs of effects processors connected to outputs of other effects processors, and the like. Furthermore, one or more effects processors may be associated with an effect. Effects rack UI panel 304 can indicate effects processors corresponding to a same effect, such as denoting those effects processor with an icon that correspond to a same effect.

The order of the effects processors displayed in effects rack UI panel 304 is consistent with designated input and output relationships for the effects processors, for example, according to a rules database that assigns input and output relationships of effects processors. The rules database can be determined a priori by a professional audio engineer. For example, Processor 1 is applied before Processor 2, which is applied before Processor 3, etc. The ordering of the ordered effects rack inhibits user mistakes made by selecting displayed effects controls in an incorrect order, such as when a user selects Processor N before Processor 1. In one example, effects rack UI panel 304 enables a user, such as an authorized user, to re-arrange the order of effects processors in the ordered effects rack. For example, an authorized user may grab an effects processor my its name in an enumerated list and move it up or down the list, thus changing the order effects processors are applied to an audio clip.

Effects rack UI panel 304 can also display various status indicators of effects processors. In one example, an effects processor in the ordered effects rack is denoted as bypassed during playback by an appropriate indicator, such as using an icon, or fading, coloring, highlighting, or otherwise changing the appearance of the bypassed effects processor in the representation 326 of the ordered effects rack displayed by effects rack UI panel 304. In another example, an indication that an audio clip has been pre-rendered using an effects processor is displayed in the representation 326 of the ordered effects rack.

Mix-type sound UI panel 306 displays effects categories and effects controls based on a mix type of at least one audio clip selected in track view UI panel 302. For example, a user may select one or more audio clips by selecting (e.g., clicking with a mouse and holding a control key down on a keyboard) one or more representations of audio clips displayed in track view UI panel 302. In one example, mix-type sound UI panel 306 is displayed in user interface 300 responsive to a user selecting one or more representations in track view UI panel 302. A user may then designate a mix type for the selected audio clips using mix-type designator window 328 in mix-type sound UI panel 306.

In the example in FIG. 3, mix-type designator window 328 contains four selectable options for mix type, including an option 330 labeled "D" for dialogue, an option 332 labeled "M" for music, an option 334 labeled "S" for sound effects, and an option 336 labeled "A" for ambience. Responsive to selecting one of the selectable options for mix type in mix-type designator window 328, mix-type sound UI panel 306 displays effects categories and effects controls for the designated mix type (discussed below in more detail with respect to FIG. 4 and FIG. 5). A user may change the designated mix type, for example by selecting option 336 instead of option 332, which causes a different set of effects categories and effects controls to be displayed in mix-type sound UI panel 306. An effect can be selected in mix-type sound UI panel 306, such as by a user selection adjusting an effects control and enabling the effect, causing at least one effects processor to be placed in the ordered effects rack displayed in effects rack UI panel 304.

Advanced effects UI panel 308 displays adjustable parameters of effects processors. In one example, an effects processor is selected from a representation 326 of an ordered effects rack of effects processors displayed in effects rack UI panel 304, such as by clicking on a processor name in an ordered list and verifying authorization to access the effects processor. Responsive to the selection of the effects processor, advanced effects UI panel 308 is displayed. An authorized user can view and edit multiple adjustable parameters of the effects processor underlying an effect, and save the changes to a mapping of the adjustable parameters to the single adjuster governing the control of an effects control displayed in mix-type sound UI panel 306 (discussed below in more detail with respect to FIG. 6). For instance, advanced effects UI panel 308 enables creation and editing of keyframe values of the adjustable parameters used to map multiple adjustable parameters to the single adjuster governing the control of the effects control.

In one example, multiple adjustable parameters displayed in advanced effects UI panel 308 of an effects processor represented in effects rack UI panel 304 are mapped to a single adjuster of one of the displayed effects controls in mix-type sound UI panel 306 based on an owner of at least one audio clip. For instance, a recording company or recording artist may own audio clips being edited and provide mappings between the multiple adjustable parameters of an effects processor and the single adjuster of the corresponding effects control. Additionally or alternatively, the mappings are compliant with guidelines provided by the owner.

In one example, multiple adjustable parameters displayed in advanced effects UI panel 308 of an effects processor represented in effects rack UI panel 304 are mapped to a single adjuster of one of the displayed effects controls in mix-type sound UI panel 306 automatically (e.g., without user intervention) based on analysis of a selected audio clip. For instance, a mapping may be selected based on frequency content, dynamic range, signal to noise ratio, sampling width, sampling rate, etc. of a selected audio clip.

Asset rendering UI panel 310 displays rendered assets. For example, responsive to enabling playback in track view module 202 of an audio track of an asset comprising a video, asset rendering UI panel 310 displays the video concurrent with the playback of the audio track on loudspeaker 216. Asset rendering UI panel 310 can display any suitable type of rendered asset, such as by way of example and not limitation, a video, an image, a slide presentation, a document, an animation sequence, a map, a game, and the like.

In an example, asset rendering UI panel 310 displays a representation of at least one asset that changes when at least one audio clip is played, such as an animation or video.

User interface 300 can be used for comparative testing, such as comparing sound with an effect enabled and then disabled. In one example, responsive to detecting that playback of an audio clip is running and a particular effect is disabled, the disabled effect is bypassed and not removed, thus preserving delay lines of the disabled effect. By preserving delay lines of a disabled effect, rather than removing the disabled effect and not preserving the delay lines, drop outs are inhibited. For instance, an effects processor of an effect can be placed in the ordered effects rack represented in effects rack UI panel 304 responsive to a user enabling a selection box associated with an effects control in mix-type sound UI panel 306. The user may then disable the effect by disabling the selection box associated with the effects control in mix-type sound UI panel 306 while the audio clip is running, for example to do a comparison of the sound with and without the effect. By detecting that playback is running and the effect is disabled, the effects processor corresponding to the disabled effect remains in the ordered effects rack but is indicated as disabled (e.g., with a flashing effects processor name or an appropriate icon), and its delay lines in the effects chain are preserved. For example, if the effects processor comprises a digital filter, the delay of the filter can be maintained and the filter disabled, such as by replacing the filter with a delay function. Moreover, responsive to detecting that playback is paused and a particular effect is disabled, an effects processor corresponding to the disabled effect is removed from the ordered effects rack.

Furthermore, while disabled and bypassed, effects processors can continue to process data. This is important because some effects processors (e.g., noise restoration processors) have adaptive learning components that benefit from being supplied data while being bypassed. If the effects processor were removed instead of bypassed, information learned by the algorithm may need to be re-learned when the effects processor is reinserted (e.g., enabled again).

User interface 300 can display at any time some or all of panels 302, 304, 306, 308, and 310. In one example, mix-type sound UI panel 306 is closed responsive to advanced effects UI panel 308 being opened. Mix-type sound UI panel 306 can be opened responsive to advanced effects UI panel 308 being closed. Additionally or alternatively, asset rendering UI panel 310 can be opened responsive to enabling playback of an asset on track view UI panel 302, such as via enabling one of the options in transport UI panel 324.

Furthermore, accessing advanced effects UI panel 308 can require that a user be verified or authenticated. In one example, only authorized users, such as professional audio engineers, are allowed to open advanced effects UI panel 308 and close mix-type sound UI panel 306. Authorization and verification of a user can be done in any suitable fashion, such as by verifying a user's identification, membership in a group, access level, training level, employment, combinations thereof, and the like. Authorization can be determined from a user's expertise level comprising expertise data 130 obtained in expertise customization module 110 in FIG. 1.

Having considered an example user interface 300, consider now a discussion of example mix-type sound UI panels.

Example Mix-Type Sound UI Panels

Figure 4:
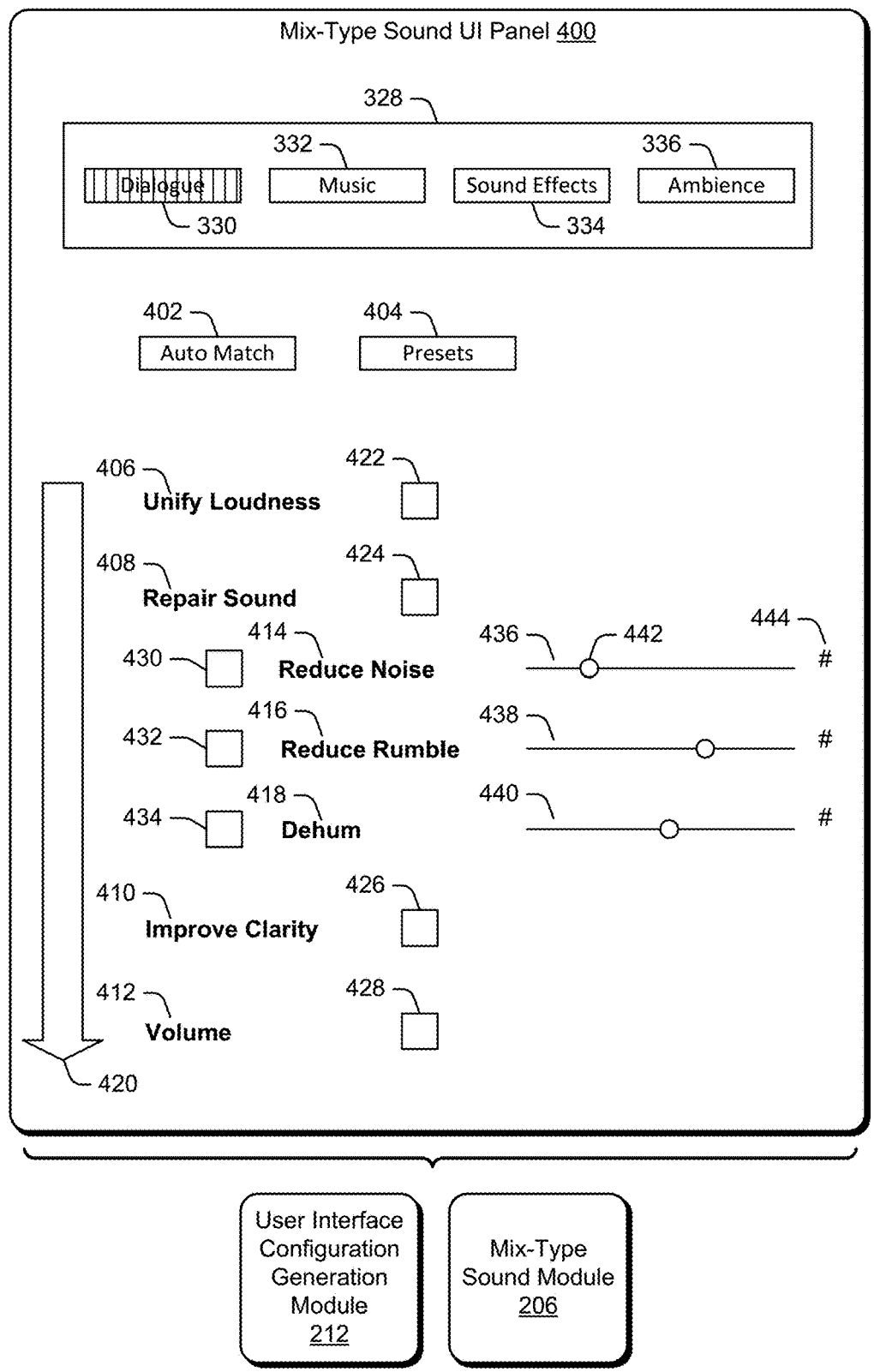
FIG. 4 is an example mix-type sound UI panel in accordance with one or more aspects of the disclosure.

FIG. 4 illustrates example mix-type sound UI panel 400 in accordance with one or more aspects of the disclosure. Mix-type sound UI panel 400 in FIG. 4 is an example of mix-type sound UI panel 306 displayed in user interface 300 responsive to a user selecting option 330 in mix-type designator window 328, and can be generated by user interface configuration generation module 212 using data supplied from mix-type sound module 206.

In FIG. 4, the selection of option 330 is denoted by the vertical lines in the box labeled "Dialogue", illustrating that the selection of mix-type for one or more audio clips is "Dialogue". In response to the selection of the mix type, mix-type sound UI panel 400 displays a plurality of options, effects categories, effects controls, adjusters, indicators, and selectors based on the selected mix type.

Mix-type sound UI panel 400 in FIG. 4 displays auto match option 402 and presets option 404. Auto match option 402 enables a user to automatically match the selected audio clip to a reference signal or range of values using a predetermined rule, such as according to a standard for audio signals of the designated mix type. For instance, a professional society or company may publish a standard of volume ranges of audio tracks of different mix type in decibels relative to a known level, and enabling auto match option 402 may set the volume level of the selected audio clips to within the standard of volume ranges. Additionally or alternatively, enabling auto match option 402 applies a predetermined spectral mask to the selected audio clips.

In one example, selecting auto match 402 causes display of multiple selectable options (not shown) for auto matching the selected audio clip. For instance, a first selectable option may be based on a published standard of an audio society, and a second selectable option may be based on a company's recommended best practices. Enabling an auto match 402 may cause a plurality of effects processors to be placed in the ordered effects rack in effects rack UI panel 304.

Presets option 404 enables a user to automatically select preset effects from a plurality of preset effects to be applied to the selected audio clip. For example, preset effects include vintage microphone (e.g., the audio clip is made to sound like it was recorded on a vintage vacuum tube microphone), vintage radio (e.g., the audio clip is made to sound like it is being played through a vintage vacuum tube radio), telephone call (e.g., the audio clip is made to sound like it is part of a telephone call), newsreel (e.g., the audio clip is made to sound like it is part of a newsreel), and the like. Enabling a preset effect may cause a plurality of effects processors to be placed in the ordered effects rack in effects rack UI panel 304.

Mix-type sound UI panel 400 also displays effects categories and effects controls, based on the designated mix type. In the example in FIG. 4, Unify Loudness 406, Repair Sound 408, Improve Clarity 410, and Volume 412 are examples of effects categories. Reduce Noise 414, Reduce Rumble 416, and Dehum 418 are examples of effects controls belonging to effects category Repair Sound 408. In one example, mix-type sound UI panel 306 also displays an indicator 420 of a suggested (e.g., predetermined) workflow of the displayed effects categories and displayed effects controls. Any suitable indicator can be used, such as an arrow, enumerations, connections between effects categories and/or effects controls, color coding, and the like that infer an ordering to the user. In one example, effects categories and effects controls are displayed in order according to the predetermined workflow by displaying the effects categories and the effects controls from top to bottom in mix-type sound UI panel 306. For instance, as displayed in FIG. 4, effects corresponding to effects category Repair Sound 408 are meant to be applied prior to effects corresponding to effects category Improve Clarity 410, but after effects corresponding to effects category Unify Loudness 406. Moreover, an effect controlled by effects control Reduce Rumble 416 is meant to be applied before an effect controlled by effects control Dehum 418, but after an effect controlled by effects control Reduce noise 414, as indicated by indicator 420.

Effects categories can be expanded to display effects controls belonging to the effects category, and contracted to hide effects controls belonging to the effects category. Expanding and contracting an effects category can be done in any suitable way, such as clicking on the name of the effects category to alternately expand and contract the effects category. In FIG. 4, effects categories Unify Loudness 406, Improve Clarity 410, and Volume 412 are displayed contracted, and effects category Repair Sound 408 is displayed expanded. An expanded effects category displays effects controls belonging to the effects category. A contracted effects category hides effects controls belonging to the effects category. Mix-type sound UI panel 400 can initially display effects categories as expanded, contracted, or a combination of expanded and contracted (e.g., some effects categories are expanded and others are contracted). In one example, mix-type sound UI panel 400 displays effects categories expanded and contracted according to a previous setting, such as whether effects categories were expanded or contracted when last viewed by a user.

Effects categories and effects controls are each associated with a selection box proximate the effects categories and effects controls to allow selection of effects controls. For example, selection box 422 is associated with effects category Unify Loudness 406; selection box 424 is associated with effects category Repair Sound 408; selection box 426 is associated with effects category Improve Clarity 410; and selection box 428 is associated with effects category Volume 412. Similarly, selection box 430 is associated with effects control Reduce Noise 414; selection box 432 is associated with effects control Reduce Rumble 416; and selection box 434 is associated with effects control Dehum 418.

An enabled selection box can be indicated as enabled by any suitable fashion, such as displaying an "X" or check in the selection box, shading the selection box, and the like. A disabled selection box can be indicated as disabled by any suitable fashion, such as displaying a "D" in the selection box, emptying the selection box, and the like. An effects control can be selected by enabling a selection box associated with that effects control. For example, to enable the effects control Dehum, selection box 434 is actuated, such as by clicking on it with a mouse button, or tabbing to selection box 434 with a tab key on a keyboard and hitting enter with an enter or return key. In one example, by enabling selection of a selection box associated with an effects category, such as by clicking a mouse button while holding a cursor over a selection box, all effects controls belonging to that effect category are selected. For instance, by enabling selection box 424 corresponding to effects category Repair Sound 408, each of the effects controls Reduce Noise 414, Reduce Rumble 416, and Dehum 418 are enabled, and their associated selection boxes 430, 432, and 434, respectively, are indicated as enabled. By disabling selection box 424 corresponding to effects category Repair Sound 408, each of the effects controls Reduce Noise 414, Reduce Rumble 416, and Dehum 418 are disabled, and their associated selection boxes 430, 432, and 434, respectively, are indicated as disabled. Individual effects controls Reduce Noise 414, Reduce Rumble 416, and Dehum 418 can each be enabled and disabled independently using selection boxes 430, 432, and 434, respectively.

In one example, a check is made to determine whether a selected displayed effect control enables a computationally intensive effect. In response to determining that the selected displayed effect control enables a computationally intensive effect, a selected audio clip may be automatically pre-rendered according to the selected displayed effect control. For example, the audio clip can be processed by an effects processor corresponding to the computationally intensive effect and stored. Once pre-rendered, an effects processor corresponding to the computationally intensive effect can be indicated as being pre-rendered in the effects rack UI panel by any suitable indicator, such as with an icon proximate the processor name Alternatively or additionally, a representation of the audio clip in track view UI panel 302 can be indicated as being pre-rendered in any suitable manner, such as by placing an icon on the representation.

Each effects control displayed in mix-type sound UI panel 400 is displayed with a respective single adjuster. For example, in FIG. 4, the effects control Reduce Noise 414 is displayed with single adjuster 436, effects control Reduce Rumble 416 is displayed with single adjuster 438, and effects control Dehum 418 is displayed with single adjuster 440. The single adjusters can be any suitable type of adjusters, such as sliders, knobs, dials, text boxes where numbers can be entered or selected, pop-up menus, and the like. In the example in FIG. 4, single adjusters 436, 438, and 440 are sliders. In operation, adjustment of the respective effects control is done by moving a slider control. For example, slider control 442 of single adjuster 436 can be slid left or right (e.g., with a user's thumb) to increase or decrease an amount of a respective effect controlled by effects control Reduce Noise 414. As slider control 442 is moved left, an amount of the respective effect is decreased; as slider control 442 is moved right, an amount of the respective effect is increased. Increasing and decreasing an amount of a respective effect corresponds to adjusting multiple adjustable parameters of an effects processor of the respective effect (discussed in more detail below with respect to FIG. 6). The amount of the respective effect adjusted by slider control 442 is displayed with an indicator belonging to the single adjuster. For example, single adjuster 436 includes indicator 444 that displays an amount of an effect controlled by effects control Reduce Noise 414 as adjusted by slider control 442. Indicator 444 displays an amount for effects Reduce Noise 414 in any suitable format, such as a percentage from 0 to 100%, as an amount in decibels (dB), and the like. Slider controls and indicators for other single adjusters, such as single adjusters 438 and 440, behave substantially similar to single adjuster 436.

In one example, mix-type sound UI panel 400 displays a single adjuster to control multiple of the displayed effects controls (not shown). For instance, a single "master" slider for effects category Repair Sound 408 can be used to control the sliders for effects controls Reduce Noise 414, Reduce Rumble 416, and Dehum belonging to effects category Repair Sound 408.

In an implementation, metadata extracted from a designated mix type, selection of one of the displayed effects controls in mix-type sound UI panel 400, and adjustment using a respective single adjuster is stored by a device implementing audio processing application 116. The stored metadata can be provided to another asset processing application. In this way, multiple asset processing applications, possibly made by different manufacturers, can be used to work on a same project. For instance, a first user of a project can define mappings of adjustable parameters of an effects processor to a single adjuster of an effects control using a first asset processing application, and a second user can work on the project on a second asset processing application using the mappings defined by the first user. In this way, the same behavior of audio processing application 116 can be enforced for multiple users. For example, a professional user (e.g., an authorized user) may define mappings of adjustable parameters of a effects processors to single adjusters of effects controls. These mappings may define a master template provided to multiple users, possibly using different asset processing applications, to enforce the same behavior for the multiple users. For instance, the multiple adjustable parameters of the effects processor placed in the ordered effects rack can be mapped to the single adjuster of the one of the displayed effects controls based on a mapping to create a master template, and the master template can be provided to other asset processing applications to enforce a same behavior with the other asset processing applications as an asset processing application used to create the master template.

Selection of an effects control in mix-type sound UI panel 400 causes at least one effects processor to be placed in an ordered effects rack displayed in effects rack UI panel 304. Furthermore, adjustment of a single adjuster in mix-type sound UI panel 400, such as one of single adjusters 436, 438, and 440, cause adjustment of multiple adjustable parameters of at least one effects processor corresponding to the adjusted effect that is in the ordered effects rack. For example, enabling selection box 430 corresponding to effects control Reduce Noise 414 can cause an adaptive noise processor to be added to the representation of the ordered effects rack displayed in effects rack UI panel 304. Furthermore, adjusting single adjuster 436 corresponding to effects control Reduce Noise 414 displayed in mix-type sound UI panel 400 can cause adjustment of multiple parameters of the adaptive noise processor in the ordered effect rack, such as a stepsize governing adaptation rate of a gradient descent algorithm used in the adaptive noise processor, a number of filter coefficients in the adaptive noise processor, an amount of coefficient leakage in the adaptive noise processor etc.

Figure 5:
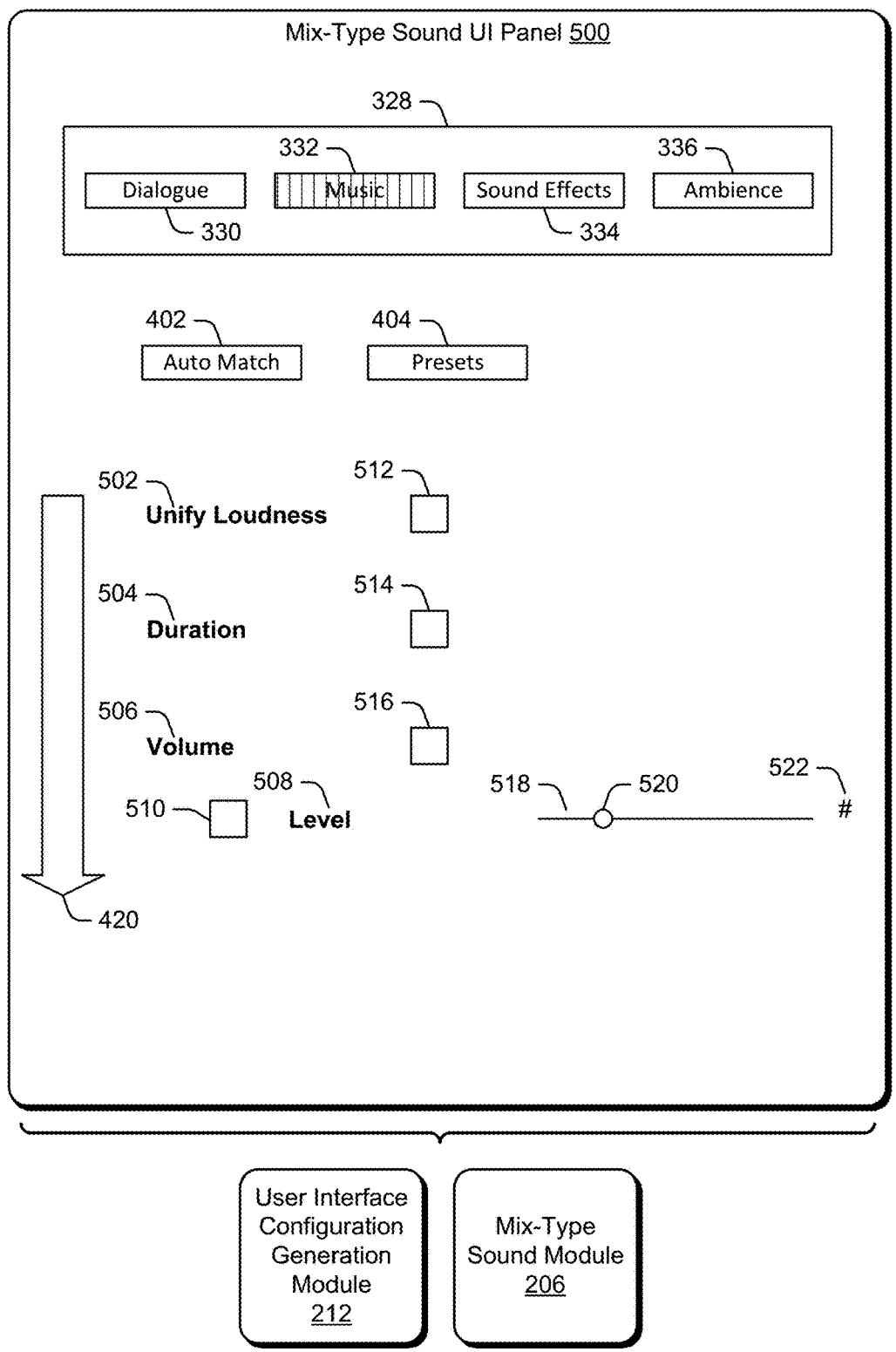
FIG. 5 is another example mix-type sound UI panel in accordance with one or more aspects of the disclosure.

FIG. 5 illustrates example mix-type sound UI panel 500 in accordance with one or more aspects of the disclosure. Mix-type sound UI panel 500 in FIG. 5 is an example of mix-type sound UI panel 306 displayed in user interface 300 responsive to a user selecting option 330 in mix-type designator window 328, and can be generated by user interface configuration generation module 212 using data supplied from mix-type sound module 206.

In FIG. 5, the selection of option 332 is denoted by the vertical lines in the box labeled "Music", illustrating that the selection of mix-type for one or more audio clips is "Music". In response to the selection of the mix type, mix-type sound UI panel 500 displays a plurality of options, effects categories, effects controls, adjusters, indicators, and selectors based on the selected mix type.

Similar to FIG. 4, mix-type sound UI panel 500 in FIG. 5 displays auto match option 402 and presets option 404. Auto match option 402 and presets option 404 in FIG. 5 behave substantially similar to auto match option 402 and presets option 404 in FIG. 4. Based on the designated mix type being different in FIG. 5 than in FIG. 4, however, auto match option 402 in FIG. 5 may automatically match the selected audio clip to a different reference or using a different standard than in FIG. 4, and presets option 404 in FIG. 5 may offer different preset effects than in FIG. 4. In one example, presets option 404 behaves the same no matter what mix type is selected, and enables the same effects processors for each mix type.

Mix-type sound UI panel 500 in FIG. 5 displays effects categories and effects controls, based on the designated mix type ("Music" in this example). In the example in FIG. 5, Unify Loudness 502, Duration 504, and Volume 506 are examples of effects categories. Level 508 is an example an effects control belonging to effects category Volume 506. Similar to the order of effects suggested by displayed indicator 420 in FIG. 4, displayed indicator 420 in FIG. 5 indicates effects corresponding to effects category Duration 504 are meant to be applied prior to effects corresponding to effects category Volume 506, but after effects corresponding to effects category Unify Loudness 502.

Moreover, selection box 510 is associated with effects control Level 508, and selection boxes 512, 514, and 516 are associated with effects categories Unify Loudness 502, Duration 504, and Volume 506, respectively. These selection boxes behave substantially the same as selection boxes in FIG. 4. In addition, effects control Level 508 is associated with single adjuster 518 comprising slider control 520 and indicator 522. Single adjuster 518 behaves substantially the same as single adjusters 436, 438, and 440 in FIG. 4.

Based on the different designated mix types in FIG. 4 and FIG. 5, however, mix-type sound UI panel 500 displays different effects categories and different effects controls in FIG. 5 than in FIG. 4. Moreover, an effects category or effect control displayed for one mix type may also be displayed for a different mix type, but be in a different order of the displayed effects categories and effects control. Furthermore, an effects category or effects control displayed for more than one mix type may have different meanings for the different mix types. For example, adjustable parameters of an effects processor underlying an effect may be mapped to the single adjuster of an effects control for the effect using different mappings for the different mix types. Hence, moving a single adjuster for an effects control Level belonging to an effects category Volume for a first mix type, such as dialogue, may effect an audio clip differently than if the mix type was a second mix type, such as music. In one example, one of the determined effects is determined for multiple mix types, and the multiple adjustable parameters of the effects processor of the one of the determined effects are set to different values for the multiple mix types. Moreover, selecting an effects control for a first designated mix type may cause a different effects processor to be added to the ordered effects rack of effects processors represented in effects rack UI panel 304 than if the same effects control was selected for a second designated mix type.

Having considered example mix-type sound UI panels 400 and 500, consider now a discussion of an example advanced effects UI panel.

Example Advanced Effects UI Panel

Figure 6:
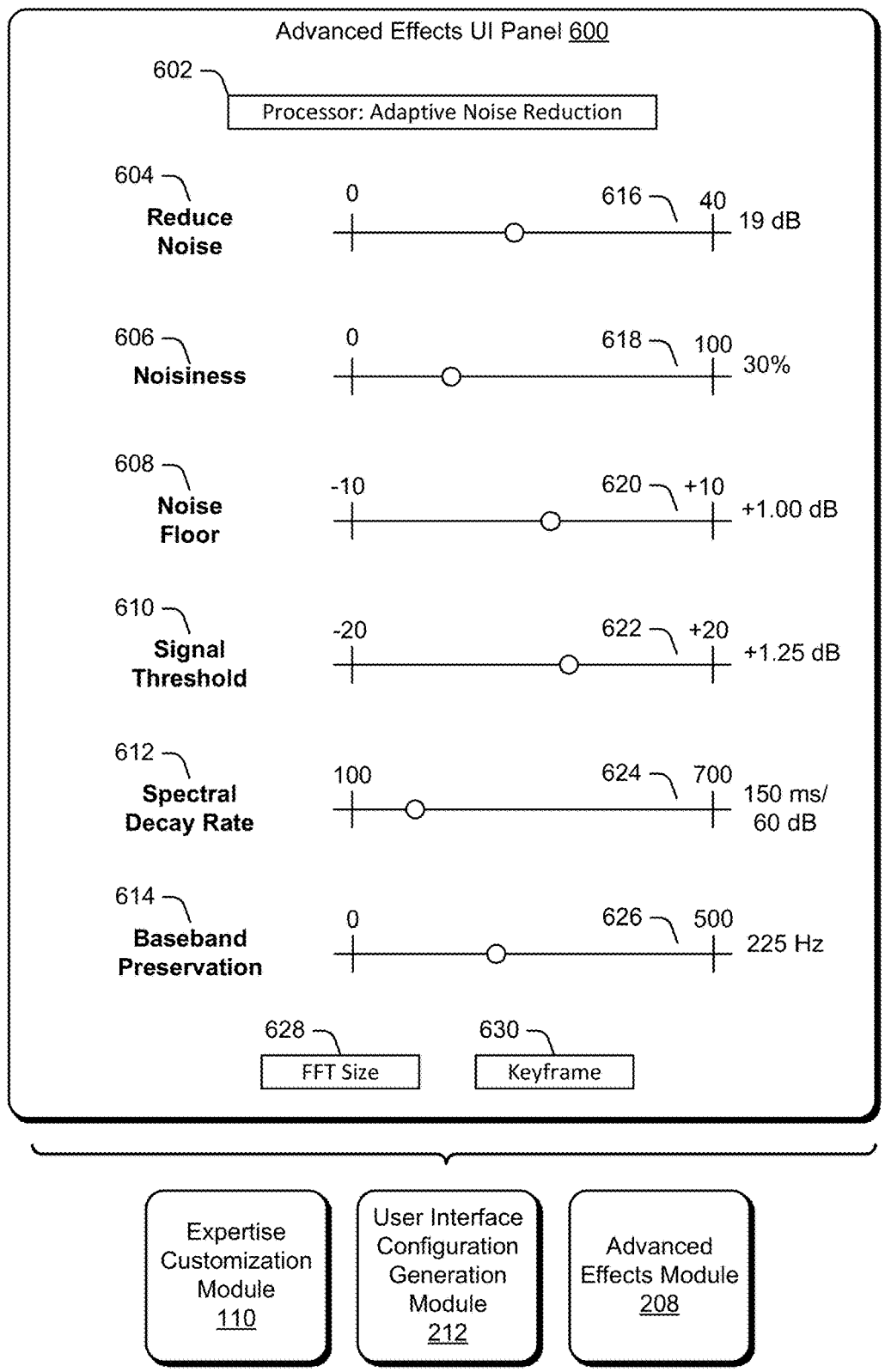
FIG. 6 is an example advanced effects UI panel in accordance with one or more aspects of the disclosure.

FIG. 6 illustrates example advanced effects UI panel 600 in accordance with one or more aspects of the disclosure. Example advanced effects UI panel 600 in FIG. 6 displays multiple adjustable parameters of an effects processor entitled Adaptive Noise Reduction. For instance, advanced effects UI panel 600 is an example of advanced effects UI panel 308 in user interface 300 where an Adaptive Noise Reduction processor is selected from effects rack UI panel 304, and can be generated by user interface configuration generation module 212 using data supplied from expertise customization module 110 and advanced effects module 208.

Indicator 602 displays the processor name of the effects processor whose multiple adjustable parameters are displayed in advanced effects UI panel 308. In the example, the processor Adaptive Noise Reduction comprises six adjustable parameters, Reduce Noise 604, Noisiness 606, Noise Floor 608, Signal Threshold 610, Spectral Decay Rate 612, and Baseband Preservation 614.

Each of the multiple adjustable parameters can be adjusted with a respective single adjuster. For example, Reduce noise 604 can be adjusted with single adjuster 616, noisiness 606 can be adjusted with single adjuster 618, Noise Floor 608 can be adjusted with single adjuster 620, Signal Threshold 610 can be adjusted with single adjuster 622, Spectral Decay Rate 612 can be adjusted with single adjuster 624, and Baseband Preservation 614 can be adjusted with single adjuster 626. Though single adjusters 616, 618, 620, 622, 624, and 626 are illustrated as sliders in FIG. 6, any suitable type of single adjuster can be used, such as sliders, knobs, dials, and the like.

The six adjustable parameters 604, 606, 608, 610, 612, and 614 control the processor Adaptive Noise Reduction. For instance, parameter Reduce Noise 604 controls a noise reduction amount in dB between 0 dB and 40 dB, and is currently set to 19 dB as indicated by single adjuster 616. Parameter Noisiness 606 controls a noisiness amount in percent between 0% and 100%, and is currently set to 30% as indicated by single adjuster 618. Parameter Noise Floor 60 controls a noise floor level in dB between −10 dB and +10 dB, and is currently set to +1.00 dB as indicated by single adjuster 620. Parameter Signal Threshold 610 controls a signal threshold level in dB between −20 dB and +20 dB, and is currently set to +1.25 dB as indicated by single adjuster 622. Parameter Spectral Decay Rate 612 controls a decay rate in milliseconds (msec) per 60 dB between 100 msec and 700 msec, and is currently set to 150 msec/60 dB as indicated by single adjuster 624. Parameter Baseband Preservation 614 controls a frequency of a baseband preservation filter in Hz between 0 Hz and 500 Hz, and is currently set to 225 Hz as indicated by single adjuster 626.

Adjustable parameters 604, 606, 608, 610, 612, and 614 and single adjusters 616, 618, 620, 622, 624, and 626 are examples of multiple adjustable parameters that can be displayed in advanced effects UI panel 600 and adjusted with single adjusters. In general, advanced effects UI panel 600 can display multiple adjustable parameters of an effects processor each configured to be adjusted with a respective single adjuster in any suitable way and using any suitable representation of the multiple adjustable parameters, such as plotting an impulse response of a time domain filter function whose impulse response coefficients can be adjusted, plotting a frequency response of a frequency domain filter function whose frequency response coefficients can be adjusted, displaying a bar graph of adjustable parameters and enabling adjustment of the bars in the bar graph to adjust the adjustable parameters, and the like. In one example, adjustable parameter 628 is displayed in a box. Adjustable parameter 628 is used to set a fast Fourier transform (FFT) size of the effects processor designated by indicator 602 (here, the processor Adaptive Noise Reduction), and can be adjusted in any suitable way, such as by entering a number in the box of adjustable parameter 628, clicking or hovering with a mouse to open a window with options of FFT size, such as 128, 256, 512, 1024, and 2048, and the like.

In addition to displaying a representation of the multiple adjustable parameters of an effects processor, advanced effects UI panel 600 can indicate, responsive to adjusting the multiple adjustable parameters, a change to the representation. For example, advanced effects UI panel 308 may plot an impulse response of a time domain filter function whose impulse response coefficients can be adjusted (e.g., the impulse response coefficients are multiple adjustable parameters of the time domain filter function). Advanced effects UI panel 600 may also display a frequency response of the time domain filter function. Responsive to a user adjusting the impulse response coefficients, advanced effects UI panel 600 updates the displayed frequency response to match the adjusted impulse response coefficients.

As discussed previously, access to viewing, editing, or viewing and editing advanced effects UI panel 600 may be limited to users who are verified or authorized. Verification and authorization of a user can be done in any suitable fashion, such as by verifying a user's identification, membership in a group, access level, training level, employment, eye scan, fingerprint, combinations thereof, and the like. Authorization can be determined from a user's expertise level comprising expertise data 130 obtained in expertise customization module 110 in FIG. 1. In one example, single adjusters for the multiple adjustable parameters are displayed in advanced effects UI panel 600 responsive to receiving a selection by a user authorized to edit the multiple adjustable parameters.

Advanced effects UI panel 600 also provides an authorized user to define keyframe values used to map the multiple adjustable parameters of the effects processor displayed in advanced effects UI panel 600 to the single adjuster of the effects control corresponding to the effects processor displayed in mix-type sound UI panel (e.g., 306, 500, and 600). For example, advanced effects UI panel 600 displays keyframe option 630. By selecting keyframe option 630, a user is enabled to assign settings of one or more of the adjustable parameters as a keyframe value, such as minimum and maximum values of an adjustable parameter. The effects processor is mapped to the adjustment of the respective single adjuster by interpolating the multiple adjustable parameters between keyframe values, as previously described. Multiple keyframe values can be defined for each adjustable parameter, and mapped to a plurality of regions of adjustment of a respective single adjuster.

In one example, selecting keyframe option 630 requires another level of user authorization than the level of authorization required to access advanced effects UI panel 600. For instance, access to advanced effects UI panel 600 may require that the user belong to a certain group, and selecting keyframe option 630 may require that the user has a predetermined amount of training, such as passing certain audio engineering training courses, or being a professional audio engineer.

Responsive to advanced effects UI panel 600 being opened from an action taken on effects rack UI panel 304, such as a user clicking on a processor name displayed in effects rack UI panel 304, adjustments made to an adjustable parameter of the effects processor in advanced effects UI panel 600 are saved to the effects processor in the ordered effects rack displayed in effects rack UI panel 304.

Using single adjusters for sound effects displayed according to an ordered workflow for novice users and allowing access for verified, trained users to a plurality of adjustable parameters of an effects processor underlying the sound effect constitutes an improvement over current editing techniques which merely provide a simplified interface for all users. By using an ordered workflow to display effects categories and effects controls and place effects processors of selected effects in an ordered effects rack, mistakes made by novice users due to selecting effects in an improper order are corrected. Furthermore, novice users are limited to making adjustments of effects within predefined ranges set by more experienced users while more experienced users are free to make full adjustment of parameters of effects processors underlying effects.

Moreover, a novice user who makes mistakes can be alerted of the mistake, such as by displaying a warning message when an effects processor is placed in the ordered effects rack in an order different from the order effects are selected by the user. Hence, the techniques described herein provide a learning aid for the user, who learns from their mistakes, and is trained in the art of audio processing simply by using the techniques described herein. Moreover, by placing effects processors in an ordered effects rack according to a predetermined set of rules, rather than corresponding to an order that effects are selected by the user, compliance with policy, such as a company policy governing use of sound effects, is guaranteed.

Having considered a digital medium environment that includes an example asset processing application that can be accessed with an example user interface, consider now example methods in accordance with one or more aspects.

Example Procedures

Figure 7:
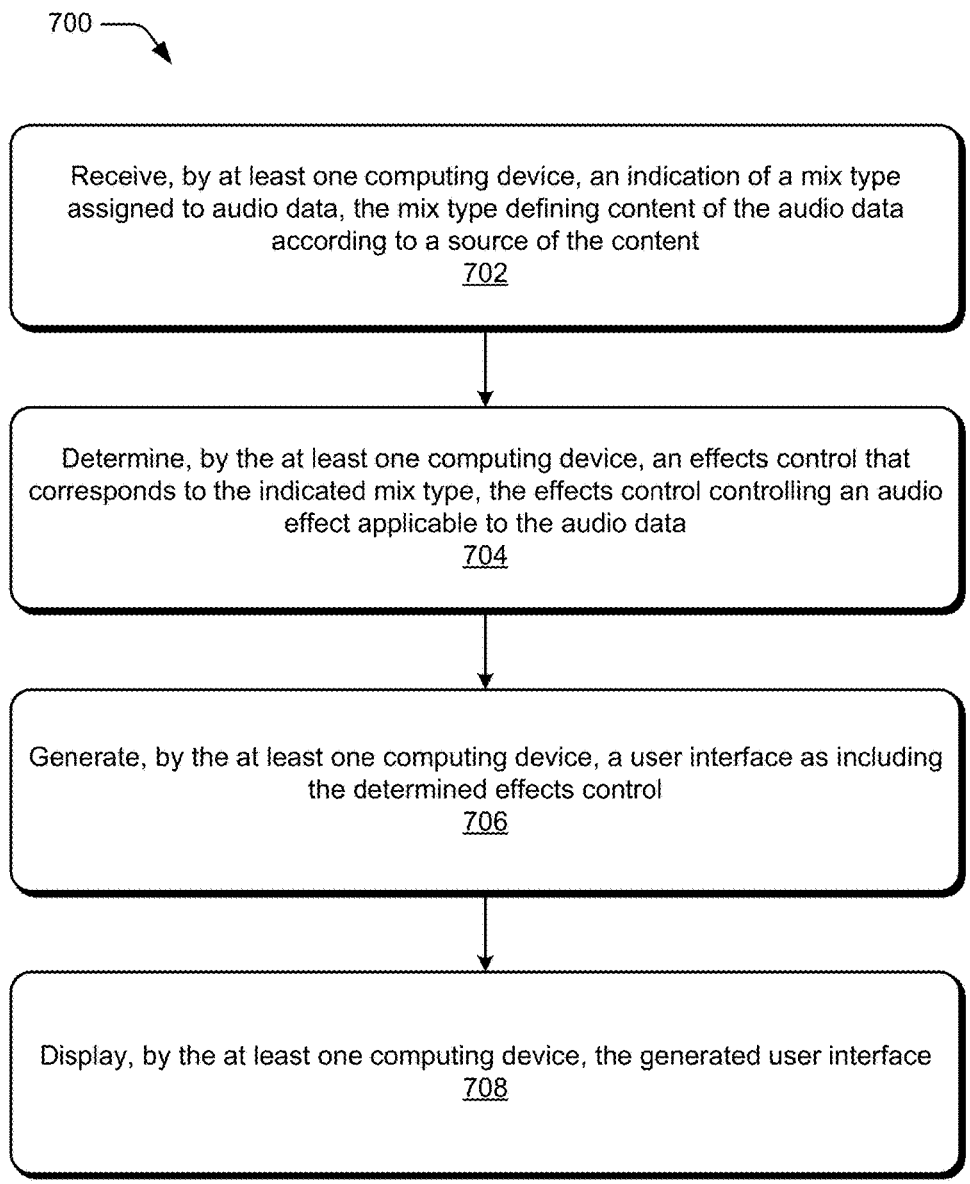
FIG. 7 is a flow diagram depicting an example procedure in accordance with one or more aspects of the disclosure.

FIG. 7 illustrates an example procedure 700 for editing audio clips in accordance with one or more aspects of the disclosure. Aspects of the procedure may be implemented in hardware, firmware, or software, or a combination thereof The procedure is shown as a set of blocks that specify operations performed by one or more devices and are not necessarily limited to the orders shown for performing the operations by the respective blocks. In at least some aspects the procedure may be performed in a digital medium environment by a suitably configured device, such as the example computing device 102 of FIG. 1 that makes use of an audio processing application, such as that described above. An audio processing application implementing procedure 700 may be an independent application that has been installed on computing device 102, a service hosted by service provider that is accessible by computing device 102, or a plug-in module to computing device 102.

An indication of a mix type assigned to audio data is received (block 702). The mix type defines content of the audio data according to a source or type of the content. For instance, the mix type can be one of dialogue, sound effects, music, or ambience. In one example, a user selects an option in a mix-type sound UI panel to assign a mix-type to the audio data. In another example, a mix type is included with the audio data, such as part of metadata of at least one audio clip comprising the audio data. Metadata can be included in the at least one audio clip. Alternatively or additionally, metadata can be included in an audio file from which the audio data is obtained. In still another example, an indication of mix type is obtained by accessing a database of mix types, such as by using metadata associated with at least one audio clip to look up a mix type for the at least one audio clip in the database of mix types. In yet another example, a mix type is automatically assigned to an audio clip by analyzing the audio clip, such as analyzing the audio clip based on frequency content, dynamic range, spatial measures (e.g., separation of sound sources), and the like.

An effects control is determined that corresponds to the indicated mix type, the effects control controlling an audio effect applicable to the audio data (block 704). Effects categories containing the effects control can also be determined, based on the indicated mix type.

A user interface is generated as including the determined effects control (block 706). The generated user interface may also include effects categories determined for the indicated mix type.

The generated user interface is displayed (block 708). In one example, displaying the generated user interface further comprises displaying the effects control in an order based on a defined workflow. Displaying the generated user interface can comprise displaying the effects control with a single adjuster that adjusts at least one adjustable parameter of an effects processor corresponding to the audio effect, the effects processor modifying the audio data when the audio effect is applied to the audio data.

Furthermore, displaying the user interface can comprise determining a user is authorized to edit the at least one adjustable parameter, receiving a user selection from the authorized user to edit the at least one adjustable parameter, and displaying, responsive to receiving the selection, at least one adjuster for the at least one adjustable parameter.

Displaying can also comprise displaying a representation of the audio data in a first panel of the generated user interface, displaying the effects control in a second panel of the generated user interface, and displaying an ordered effects rack of effects processors, including an effects processor corresponding to the audio effect controlled by the displayed effects control, in a third panel of the generated user interface, each said effects processor modifying the audio data when a respective audio effect is applied to the audio data.

In one example, a mapping is received, the mapping describing how adjustment of the single adjuster is mapped to adjustment of multiple adjustable parameters comprising the at least one adjustable parameter by interpolating the multiple adjustable parameters between keyframe values. The mapping can be user specified and the single adjuster can be designated for use by a group of users and configured to support overwrite of changes made with the single adjuster by a user of the group of users.

Moreover, a user selection of the effects control can be received. It can be determined that the selected effects control controls a computationally intensive audio effect, and the audio data can be automatically pre-rendered according to the selected effects control in response to the determining that the selected effects control controls a computationally intensive audio effect.

In one example, it is detected that playback is occurring and there is a disabled effect. The disabled effect can be bypassed by preserving delay lines caused by the disabled effect, inhibiting dropouts when the audio is rendered.

A selection of the displayed effects control can be received, and responsive to the receiving, an effects processor corresponding to the audio effect controlled by the selected effects control can be placed in an ordered effects rack of effects processors, each said effects processor modifying the audio data when a respective audio effect is applied to the audio data. The ordered effects rack has an ordering of the effects processors unrelated to an order of selections in which the selection of the displayed effects control is received. For instance, the ordering of the ordered effects rack can be determined using a rules database that assigns input and output relationships of effects processors. The rules database can be determined a priori by a professional audio engineer. In one example, based on the received selection of the one of the displayed effects controls, multiple effects processors corresponding to the one of the displayed effects controls are placed in an ordered effects rack. Each of the multiple effects processors placed in the ordered effects rack comprise multiple adjustable parameters that are mapped to the one of the displayed effects controls. Hence, adjusting the one of the displayed effects controls causes adjustment of multiple adjustable parameters for each of the multiple effects processors corresponding to the one of the displayed effects controls.

The audio data can be played back with the audio effect applied to the audio data by modifying the audio data with the effects processors in the ordered effects rack. For instance, a user may select a playback option for an audio track in a track view UI panel, causing effects processors in the ordered effects rack to be applied to an audio clip comprising the audio track, which is subsequently played through a loudspeaker.

Using single adjusters for effects controls displayed according to an ordered workflow for novice users and allowing access for verified users to a plurality of adjustable parameters of an effects processor underlying a sound effect controlled by the effects controls constitutes an improvement over current editing techniques which merely provide a simplified interface for all users. By using an ordered workflow to display effects categories and effects controls and place effects processor of selected effects controls in an ordered effects rack, mistakes made by novice users due to selecting effects in an improper order are corrected. Furthermore, novice users are limited to making adjustments of effects within predefined ranges set by more experienced users while more experience users are free to make full adjustment of parameters of effects processors underlying effects.

Figure 8:
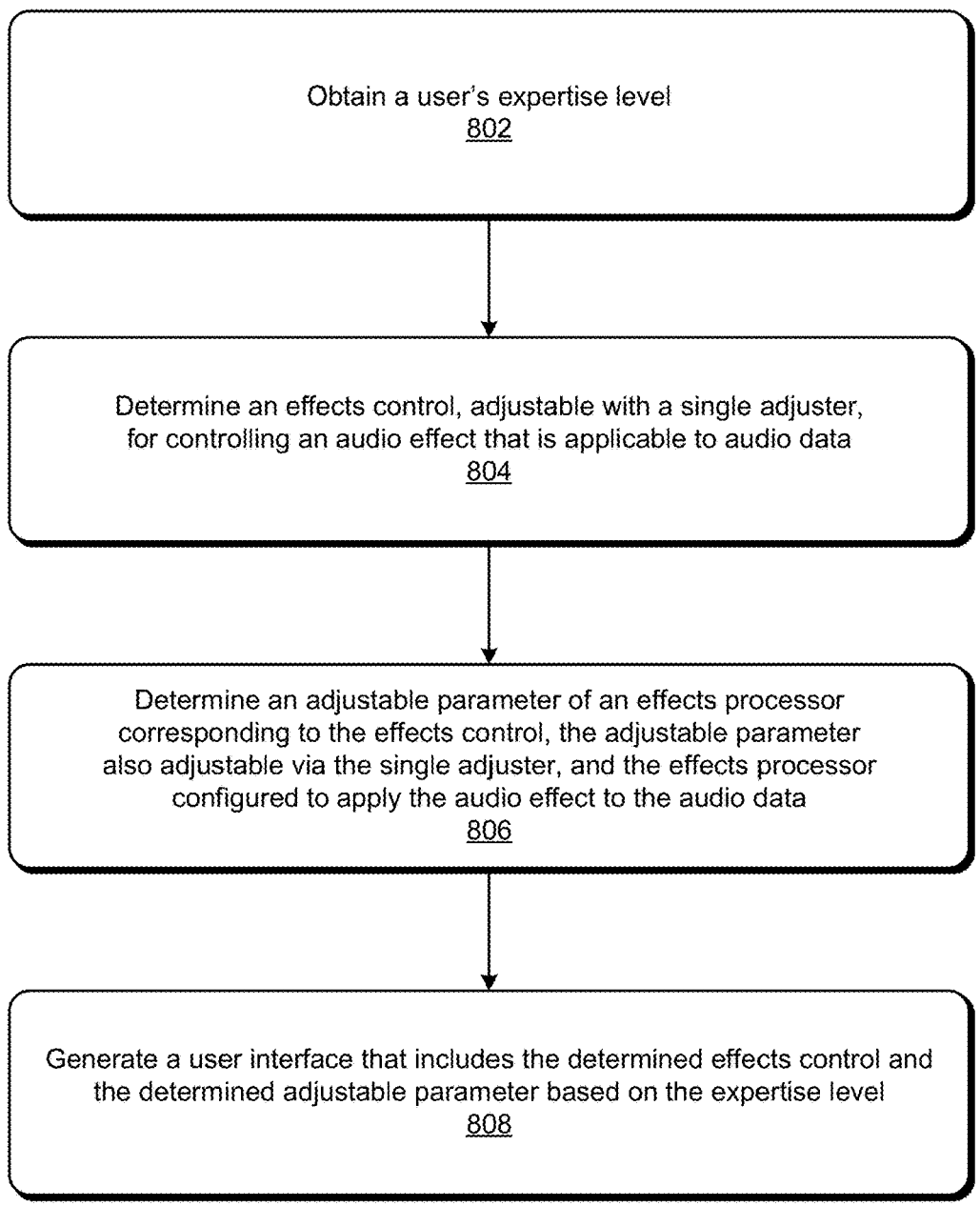
FIG. 8 is a flow diagram depicting an example procedure in accordance with one or more aspects of the disclosure.

FIG. 8 illustrates an example procedure 800 for editing audio clips in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects the procedure may be performed in a digital medium environment by a suitably configured device, such as the example computing device 102 of FIG. 1 that makes use of an audio processing application, such as that described above. An audio processing application implementing procedure 800 may be an independent application that has been installed on computing device 102, a service hosted by service provider that is accessible by computing device 102, or a plug-in module to computing device 102.

A user's expertise level is obtained (block 802). A user's expertise level can be obtained in any suitable way, such as by verifying a user's identification, membership in a group, access level, training level, employment, fingerprint, eye scan, combinations thereof, and the like.

An effects control, adjustable with a single adjuster, for controlling an audio effect that is applicable to audio data is determined (block 804). The effects control can belong to an effects category, and the effects category and effects control can be determined based on the user's expertise level.

An adjustable parameter of an effects processor corresponding to the effects control is determined (block 806). The adjustable parameter is also adjustable via the single adjuster, and the effects processor is configured to apply the audio effect to the audio data.

A user interface is generated that includes the determined effects control and the determined adjustable parameter based on the expertise level (block 808). In one example, the user interface displays the determined effects control and, based on the expertise level being a first expertise level, displays the single adjuster for the displayed effects control, or based on the expertise level being a second expertise level, displays the single adjuster for the displayed effects control and the determined adjustable parameter.

The second expertise level can correspond to a higher level of audio-editing expertise than the first expertise level, and the determined adjustable parameter of the effects processor includes multiple adjustable parameters mapped to adjustment of the single adjuster by a user having at least the second expertise level.

Figure 9:
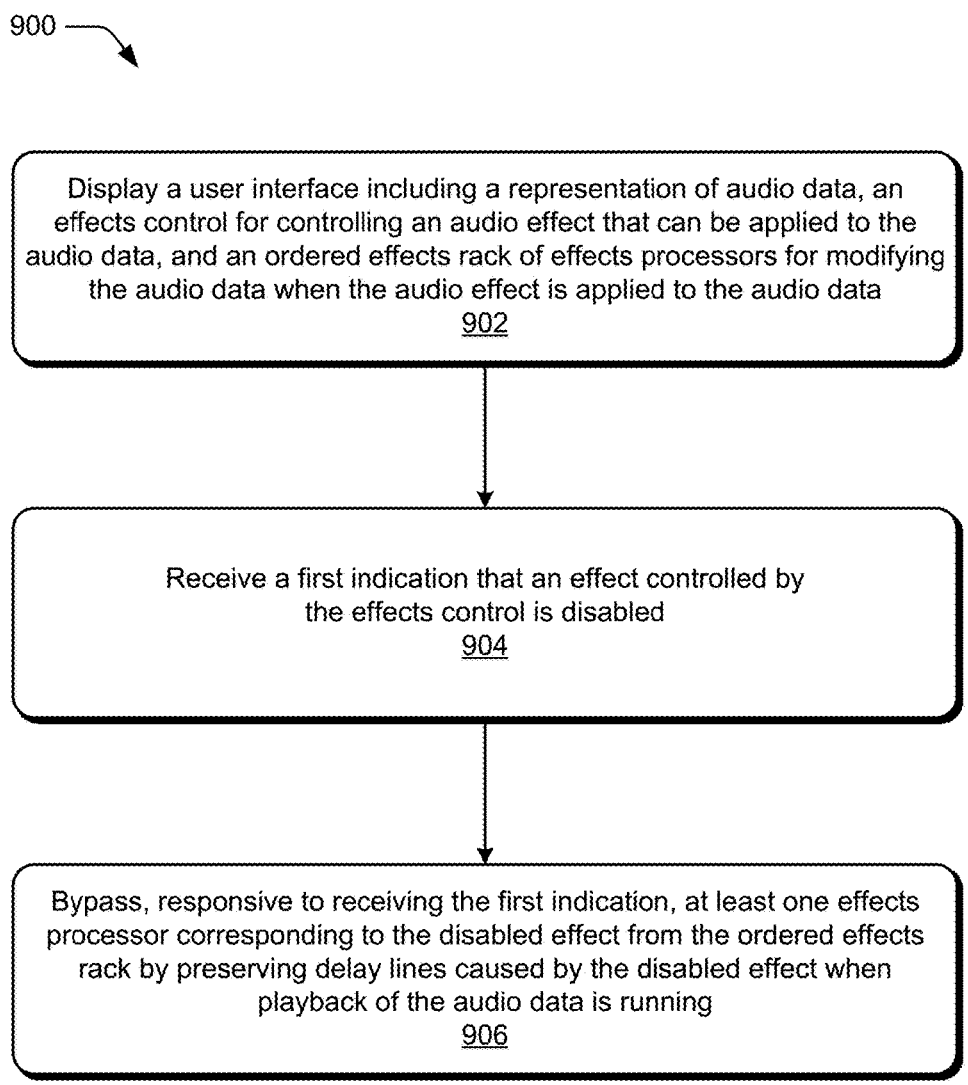
FIG. 9 is a flow diagram depicting an example procedure in accordance with one or more aspects of the disclosure.

FIG. 9 illustrates an example procedure 900 for editing audio clips in accordance with one or more aspects of the disclosure. Aspects of the procedure may be implemented in hardware, firmware, or software, or a combination thereof The procedure is shown as a set of blocks that specify operations performed by one or more devices and are not necessarily limited to the orders shown for performing the operations by the respective blocks. In at least some aspects the procedure may be performed in a digital medium environment by a suitably configured device, such as the example computing device 102 of FIG. 1 that makes use of an audio processing application, such as that described above. An audio processing application implementing procedure 900 may be an independent application that has been installed on computing device 102, a service hosted by service provider that is accessible by computing device 102, or a plug-in module to computing device 102.

A user interface is displayed (block 902). The user interface includes a representation of audio data, an effects control for controlling an audio effect that can be applied to the audio data, and an ordered effects rack of effects processors for modifying the audio data when the audio effect is applied to the audio data.

A first indication is received that the audio effect controlled by the effects controls is disabled (block 904).

Responsive to receiving the first indication, at least one effects processor corresponding to the disabled effect from the ordered effects rack is bypassed by preserving delay lines caused by the disabled effect when playback of the audio data is running (block 906).

In one example, a second indication that the audio effect is not disabled is received, and responsive to receiving the second indication, the at least one effects processor is applied to the audio data when playback of the at audio data is running An additional indication that playback of the at least one audio clip is paused can be received, and, responsive to receiving the additional indication, the at least one effects processor can be removed from the ordered effects rack.

Having considered example procedures in accordance with one or more implementations, consider now an example system and device that can be utilized to practice the inventive principles described herein.

Example System and Device

FIG. 10 illustrates an example system generally at 1000 that includes an example computing device 1002 that is representative of one or more computing systems and devices that may implement the various techniques described herein. This is illustrated through inclusion of sound processing system 104 and audio processing application 116, which operate as described above. The computing device 1002 may be, for example, a server of a service provider, a device associated with a client (e.g., a client device), an on-chip system, multiple computing devices, combinations thereof, or any other suitable computing device or computing system.

The example computing device 1002 includes a processing system 1004, one or more computer-readable media 1006, and one or more I/O interfaces 1008 that are communicatively coupled, one to another. Although not shown, computing device 1002 may further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

Processing system 1004 is representative of functionality to perform one or more operations using hardware. Accordingly, processing system 1004 is illustrated as including hardware elements 1010 that may be configured as processors, functional blocks, and so forth. This may include implementation in hardware as an application specific integrated circuit or other logic device formed using one or more semiconductors. Hardware elements 1010 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions.

Computer-readable storage media 1006 is illustrated as including memory/storage 1012. Memory/storage 1012 represents memory/storage capacity associated with one or more computer-readable media. Memory/storage component 1012 may include volatile media (such as random access memory (RAM)), nonvolatile media (such as read only memory (ROM), Flash memory, optical disks, magnetic disks, and so forth), or combinations thereof Memory/storage component 1012 may include fixed media (e.g., RAM, ROM, a fixed hard drive, and so on) as well as removable media (e.g., Flash memory, a removable hard drive, an optical disc, and so forth). Computer-readable media 1006 may be configured in a variety of other ways as further described below.

Computing device 1002 also includes applications 1014. Applications 1014 are representative of any suitable applications capable of running on computing device 1002, and may include a web browser which is operable to access various kinds of web-based resources (e.g., assets, audio clips, content, and services). Applications 1014 include audio processing application 116, as previously described.

Input/output interface(s) 1008 are representative of functionality to allow a user to enter commands and information to computing device 1002, and also allow information to be presented to the user and other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by computing device 1002. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flashmemory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 1010, or combinations thereof. Computing device 1002 may be configured to implement particular instructions and functions corresponding to the software and hardware modules. Accordingly, implementation of a module that is executable by computing device 1002 as software may be achieved at least partially in hardware, e.g., through use of computer-readable storage media and hardware elements 1010 of processing system 1004. The instructions and functions may be executable/operable by one or more articles of manufacture (for example, one or more computing devices 1002 or processing systems 1004) to implement techniques, modules, and examples described herein.

The techniques described herein may be supported by various configurations of computing device 1002 and are not limited to the specific examples of the techniques described herein. This functionality may also be implemented all or in part through use of a distributed system, such as over a "cloud" 1016 via a platform 1018 as described below.

Cloud 1016 includes and is representative of a platform 1018 for resources 1020. Platform 1018 abstracts underlying functionality of hardware (e.g., servers) and software resources of cloud 1016. Resources 1020 may include applications, data, or applications and data that can be utilized while computer processing is executed on servers that are remote from computing device 1002. Resources 1020 can also include services provided over the Internet, through a subscriber network, such as a cellular or Wi-Fi network, or combinations thereof. Resources 1020 can include asset store 1022, which stores original assets, asset representations, and audio data, and may be accessed by computing device 1002.

Platform 1018 may abstract resources and functions to connect computing device 1002 with other computing devices. Platform 1018 may also serve to abstract scaling of resources to provide a corresponding level of scale to encountered demand for resources 1020 that are implemented via platform 1018. Accordingly, in an interconnected device embodiment, implementation of functionality described herein may be distributed throughout system 1000. For example, the functionality may be implemented in part on computing device 1002 as well as via platform 1018 that abstracts the functionality of cloud 1016.

CONCLUSION

In one or more implementations, a digital medium environment includes an audio processing application that generates a user interface for editing audio data. Effects controls for sound effects are displayed each with a single adjuster according to an ordered workflow based on a mix type of an audio clip, such as music, dialogue, etc. Adjustment of a single adjuster for a sound effect causes adjustment of a plurality of parameters of one or more effects processors underlying the sound effect. Furthermore, effects processors corresponding to selected sound effects are placed in an effects rack in a correct order, rather than in an order in which the sound effects are selected, thus correcting user mistakes. The techniques described herein allow users of varied skill levels to work on a same project, and provide a dynamic user interface suitable to the user's skill level. Furthermore, the techniques described herein allow for comparative testing of rendered audio with an audio effect disabled and subsequently enabled without dropouts in the rendered audio.

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to configure a user interface to edit audio data, a method implemented by at least one computing device, the method comprising:
  receiving, by the at least one computing device, an indication of a mix type assigned to the audio data, the mix type defining content of the audio data according to a source of the content;
  determining, by the at least one computing device, an effects control that corresponds to the mix type, the effects control controlling an audio effect applicable to the audio data;
  generating, by the at least one computing device, a user interface as including the effects control;
  displaying, by the at least one computing device, the user interface including displaying the effects control with a single adjuster that adjusts at least one adjustable parameter of an effects processor corresponding to the audio effect, the effects processor modifying the audio data when the audio effect is applied to the audio data; and
  receiving a mapping describing how adjustment of the single adjuster is mapped to adjustment of multiple adjustable parameters comprising the at least one adjustable parameter by interpolating the multiple adjustable parameters between keyframe values.

2. The method as described in claim 1, wherein the displaying the user interface further comprises displaying the effects control in an order based on a defined workflow.

3. The method as described in claim 1, further comprising:
  determining a user is authorized to edit the at least one adjustable parameter;
  receiving a user selection from the user to edit the at least one adjustable parameter; and
  displaying, responsive to receiving the selection, at least one adjuster for the at least one adjustable parameter.

4. The method as described in claim 1, wherein a master template is provided to audio processing applications to enforce a same behavior across the audio processing applications, the master template created by mapping the multiple adjustable parameters comprising the at least one adjustable parameter to adjustment of the single adjuster.

5. The method as described in claim 1, wherein the mapping is user specified and the single adjuster is designated for use by a group of users and configured to support overwrite of changes made with the single adjuster by a user of the group of users.

6. The method as described in claim 1, further comprising:
  receiving a user selection of the effects control;
  determining that the effects control controls a computationally intensive audio effect; and
  automatically pre-rendering the audio data according to the effects control in response to the determining that the effects control controls the computationally intensive audio effect.

7. The method as described in claim 1, further comprising:
  detecting that playback is occurring and there is a disabled effect; and
  bypassing, responsive to the detecting, the disabled effect by preserving processing delay lines caused by the disabled effect.

8. The method as described in claim 1, further comprising:
  receiving a selection of the effects control; and
  placing, responsive to the receiving the selection of the effects control, the effects processor in an ordered effects rack of effects processors, each effects processor of said effects processors modifying the audio data when a respective audio effect is applied to the audio data, the ordered effects rack having an ordering of said effects processors unrelated to an order of selections in which the selection of the effects control is received.

9. The method as described in claim 1, wherein the displaying the user interface further comprises:
  displaying a representation of the audio data in a first panel of the user interface;
  displaying the effects control in a second panel of the user interface; and
  displaying an ordered effects rack of effects processors, including the effects processor, in a third panel of the user interface, each effects processor of said effects processors modifying the audio data when a respective audio effect is applied to the audio data.

10. In a digital medium environment, a system comprising:
  one or more processors; and
  one or more computer storage media having stored thereon multiple instructions that, responsive to execution by the one or more processors, cause the one or more processors to:
    obtain a user's expertise level;
    determine an effects control, adjustable with a single adjuster, for controlling an audio effect that is applicable to audio data;
    determine an adjustable parameter of an effects processor corresponding to the effects control, the adjustable parameter also adjustable via the single adjuster, and the effects processor configured to apply the audio effect to the audio data; and
    generate a user interface that includes the effects control and the adjustable parameter based on the expertise level, the user interface displaying the effects control and:
      based on the expertise level being a first expertise level, the single adjuster for the effects control; or
      based on the expertise level being a second expertise level, the single adjuster for the effects control and the adjustable parameter.

11. The system as described in claim 10, wherein the adjustable parameter of the effects processor includes multiple adjustable parameters mapped to adjustment of the single adjuster by a user having at least the second expertise level.

12. The method as described in claim 1, wherein the displaying the user interface comprises displaying a workflow indicator that suggests an order of effects controls.

13. The system as described in claim 10, wherein to obtain a user's expertise level comprises verifying a training level for the user.

14. The system as described in claim 10, wherein the second expertise level corresponds to a higher level of audio-editing expertise than the first expertise level.

15. The system as described in claim 10, wherein the one or more processors further:
  receive a first indication that the audio effect is disabled; and bypass, responsive to receiving the first indication, at least one effects processor corresponding to the audio effect from an ordered effects rack of effects processors by preserving processing delay lines caused by the audio effect when playback of the audio data is running.

16. The system as described in claim 15, wherein the one or more processors further:
   receive a second indication that the audio effect is not disabled; and
   apply, responsive to receiving the second indication, the at least one effects processor to the audio data when playback of the audio data is running.

17. The system as described in claim 15, wherein the one or more processors further:
   receive an additional indication that playback of the audio data is paused; and
   remove, responsive to receiving the additional indication, the at least one effects processor from the ordered effects rack.

18. In a digital medium environment to configure a user interface to edit audio data, a method implemented by at least one computing device, the method comprising:
   receiving, by the at least one computing device, an indication of a mix type assigned to the audio data, the mix type defining content of the audio data according to a source of the content;
   determining, by the at least one computing device, an effects control that corresponds to the mix type, the effects control controlling an audio effect applicable to the audio data;
   generating, by the at least one computing device, a user interface as including the effects control;
   receiving, by the at least one computing device, a selection of the effects control; and
   placing, by the at least one computing device and responsive to the receiving the selection, an effects processor corresponding to the audio effect controlled by the effects control in an ordered effects rack of effects processors, each effects processor of said effects processors modifying the audio data when a respective audio effect is applied to the audio data, the ordered effects rack having an ordering of said effects processors unrelated to an order of selections in which the selection of the effects control is received.

19. The method as described in claim 18, further comprising automatically pre-rendering the audio data according to the effects control in response to determining that the effects control controls a computationally intensive audio effect.

20. The method as described in claim 18, further comprising:
   detecting that playback is occurring and there is a disabled effect; and
   bypassing, responsive to the detecting, the disabled effect by preserving processing delay lines caused by the disabled effect.

* * * * *